(12) United States Patent
Costa

(10) Patent No.: US 10,813,074 B2
(45) Date of Patent: Oct. 20, 2020

(54) SYSTEMS AND METHODS FOR MANAGING RESOURCE UTILIZATION IN A NETWORK OF MOVING THINGS, FOR EXAMPLE INCLUDING AUTONOMOUS VEHICLES

(71) Applicant: Veniam, Inc., Mountain View, CA (US)

(72) Inventor: Rui Costa, Sintra (PT)

(73) Assignee: VENIAM, INC., Mountain View, CA (US)

( * ) Notice: Subject to any disclaimer, the term of this patent is extended or adjusted under 35 U.S.C. 154(b) by 132 days.

(21) Appl. No.: 15/949,867

(22) Filed: Apr. 10, 2018

(65) Prior Publication Data
US 2019/0098602 A1    Mar. 28, 2019

Related U.S. Application Data

(60) Provisional application No. 62/563,229, filed on Sep. 26, 2017.

(51) Int. Cl.
| | |
|---|---|
| *H04W 64/00* | (2009.01) |
| *H04L 29/08* | (2006.01) |
| *H04W 24/08* | (2009.01) |
| *H04W 48/16* | (2009.01) |
| *H04L 12/26* | (2006.01) |
| *H04W 88/08* | (2009.01) |
| *H04W 84/00* | (2009.01) |
| *H04W 4/40* | (2018.01) |

(52) U.S. Cl.
CPC ....... *H04W 64/003* (2013.01); *H04L 43/0817* (2013.01); *H04L 67/12* (2013.01); *H04L 67/34* (2013.01); *H04W 24/08* (2013.01); *H04W 48/16* (2013.01); *H04W 4/40* (2018.02); *H04W 84/005* (2013.01); *H04W 88/08* (2013.01)

(58) Field of Classification Search
CPC ... H04W 64/003; H04W 24/08; H04W 48/16; H04W 84/005; H04W 88/08; H04L 67/12
See application file for complete search history.

(56) References Cited

U.S. PATENT DOCUMENTS

| | | | |
|---|---|---|---|
| 8,238,889 B1* | 8/2012 | Vu .................... | H04W 48/18 455/414.3 |
| 2014/0086121 A1* | 3/2014 | Emeott ............... | H04L 67/34 370/311 |
| 2016/0073336 A1* | 3/2016 | Geller ................ | H04W 72/085 455/434 |
| 2017/0131987 A1* | 5/2017 | Chen .................. | G06F 8/60 |
| 2017/0142649 A1* | 5/2017 | El-Moussa .......... | H04W 12/02 |
| 2019/0090174 A1 | 3/2019 | Rocci et al. | |

* cited by examiner

*Primary Examiner* — Luat Phung
(74) *Attorney, Agent, or Firm* — McAndrews, Held & Malloy, Ltd.

(57) ABSTRACT

Communication network architectures, systems and methods for supporting a network of mobile nodes. As a non-limiting example, various aspects of this disclosure provide communication network architectures, systems, and methods for managing resource utilization in a network of moving things, for example including autonomous vehicles.

20 Claims, 13 Drawing Sheets

SYSTEMS AND METHODS FOR MANAGING RESOURCE UTILIZATION IN A NETWORK OF MOVING THINGS, FOR EXAMPLE INCLUDING AUTONOMOUS VEHICLES

CROSS-REFERENCE TO RELATED APPLICATIONS/INCORPORATION BY REFERENCE

This patent application makes reference to, claims priority to, and claims benefit from U.S. Provisional Patent Application Ser. No. 62/563,229, filed on Sep. 26, 2017, and titled "Systems and Methods for Managing Resource Utilization in a Network of Moving Things, for Example Including Autonomous Vehicles," which is hereby incorporated herein by reference in its entirety.

This patent application is related to U.S. Provisional Patent Application Ser. No. 62/222,192, filed on Sep. 22, 2015, and titled "Communication Network of Moving Things," which is hereby incorporated herein by reference in its entirety. The present application is also related to U.S. Provisional Application Ser. No. 62/221,997, titled "Integrated Communication Network for a Network of Moving Things," filed on Sep. 22, 2015; U.S. Provisional Application Ser. No. 62/222,016, titled "Systems and Methods for Synchronizing a Network of Moving Things," filed on Sep. 22, 2015; U.S. Provisional Application Ser. No. 62/222,042, titled "Systems and Methods for Managing a Network of Moving Things," filed on Sep. 22, 2015; U.S. Provisional Application Ser. No. 62/222,066, titled "Systems and Methods for Monitoring a Network of Moving Things," filed on Sep. 22, 2015; U.S. Provisional Application Ser. No. 62/222,077, titled "Systems and Methods for Detecting and Classifying Anomalies in a Network of Moving Things," filed on Sep. 22, 2015; U.S. Provisional Application Ser. No. 62/222,098, titled "Systems and Methods for Managing Mobility in a Network of Moving Things," filed on Sep. 22, 2015; U.S. Provisional Application Ser. No. 62/222,121, titled "Systems and Methods for Managing Connectivity a Network of Moving Things," filed on Sep. 22, 2015; U.S. Provisional Application Ser. No. 62/222,135, titled "Systems and Methods for Collecting Sensor Data in a Network of Moving Things," filed on Sep. 22, 2015; U.S. Provisional Application Ser. No. 62/222,145, titled "Systems and Methods for Interfacing with a Network of Moving Things," filed on Sep. 22, 2015; U.S. Provisional Application Ser. No. 62/222,150, titled "Systems and Methods for Interfacing with a User of a Network of Moving Things," filed on Sep. 22, 2015; U.S. Provisional Application Ser. No. 62/222,168, titled "Systems and Methods for Data Storage and Processing for a Network of Moving Things," filed on Sep. 22, 2015; U.S. Provisional Application Ser. No. 62/222,183, titled "Systems and Methods for Vehicle Traffic Management in a Network of Moving Things," filed on Sep. 22, 2015; U.S. Provisional Application Ser. No. 62/222,186, titled "Systems and Methods for Environmental Management in a Network of Moving Things," filed on Sep. 22, 2015; U.S. Provisional Application Ser. No. 62/222,190, titled "Systems and Methods for Port Management in a Network of Moving Things," filed on Sep. 22, 2015; U.S. Provisional Patent Application Ser. No. 62/222,192, titled "Communication Network of Moving Things," filed on Sep. 22, 2015; U.S. Provisional Application Ser. No. 62/244,828, titled "Utilizing Historical Data to Correct GPS Data in a Network of Moving Things," filed on Oct. 22, 2015; U.S. Provisional Application Ser. No. 62/244,930, titled "Using Anchors to Correct GPS Data in a Network of Moving Things," filed on Oct. 22, 2015; U.S. Provisional Application Ser. No. 62/246,368, titled "Systems and Methods for Inter-Application Communication in a Network of Moving Things," filed on Oct. 26, 2015; U.S. Provisional Application Ser. No. 62/246,372, titled "Systems and Methods for Probing and Validating Communication in a Network of Moving Things," filed on Oct. 26, 2015; U.S. Provisional Application Ser. No. 62/250,544, titled "Adaptive Rate Control for Vehicular Networks," filed on Nov. 4, 2015; U.S. Provisional Application Ser. No. 62/273,878, titled "Systems and Methods for Reconfiguring and Adapting Hardware in a Network of Moving Things," filed on Dec. 31, 2015; U.S. Provisional Application Ser. No. 62/253,249, titled "Systems and Methods for Optimizing Data Gathering in a Network of Moving Things," filed on Nov. 10, 2015; U.S. Provisional Application Ser. No. 62/257,421, titled "Systems and Methods for Delay Tolerant Networking in a Network of Moving Things," filed on Nov. 19, 2015; U.S. Provisional Application Ser. No. 62/265,267, titled "Systems and Methods for Improving Coverage and Throughput of Mobile Access Points in a Network of Moving Things," filed on Dec. 9, 2015; U.S. Provisional Application Ser. No. 62/270,858, titled "Channel Coordination in a Network of Moving Things," filed on Dec. 22, 2015; U.S. Provisional Application Ser. No. 62/257,854, titled "Systems and Methods for Network Coded Mesh Networking in a Network of Moving Things," filed on Nov. 20, 2015; U.S. Provisional Application Ser. No. 62/260,749, titled "Systems and Methods for Improving Fixed Access Point Coverage in a Network of Moving Things," filed on Nov. 30, 2015; U.S. Provisional Application Ser. No. 62/273,715, titled "Systems and Methods for Managing Mobility Controllers and Their Network Interactions in a Network of Moving Things," filed on Dec. 31, 2015; U.S. Provisional Application Ser. No. 62/281,432, titled "Systems and Methods for Managing and Triggering Handovers of Mobile Access Points in a Network of Moving Things," filed on Jan. 21, 2016; U.S. Provisional Application Ser. No. 62/268,188, titled "Captive Portal-related Control and Management in a Network of Moving Things," filed on Dec. 16, 2015; U.S. Provisional Application Ser. No. 62/270,678, titled "Systems and Methods to Extrapolate High-Value Data from a Network of Moving Things," filed on Dec. 22, 2015; U.S. Provisional Application Ser. No. 62/272,750, titled "Systems and Methods for Remote Software Update and Distribution in a Network of Moving Things," filed on Dec. 30, 2015; U.S. Provisional Application Ser. No. 62/278,662, titled "Systems and Methods for Remote Configuration Update and Distribution in a Network of Moving Things," filed on Jan. 14, 2016; U.S. Provisional Application Ser. No. 62/286,243, titled "Systems and Methods for Adapting a Network of Moving Things Based on User Feedback," filed on Jan. 22, 2016; U.S. Provisional Application Ser. No. 62/278,764, titled "Systems and Methods to Guarantee Data Integrity When Building Data Analytics in a Network of Moving Things," Jan. 14, 2016; U.S. Provisional Application Ser. No. 62/286,515, titled "Systems and Methods for Self-Initialization and Automated Bootstrapping of Mobile Access Points in a Network of Moving Things," filed on Jan. 25, 2016; U.S. Provisional Application Ser. No. 62/295,602, titled "Systems and Methods for Power Management in a Network of Moving Things," filed on Feb. 16, 2016; and U.S. Provisional Application Ser. No. 62/299,269, titled "Systems and Methods for Automating and Easing the Installation and Setup of the Infrastructure Supporting a Network of Moving Things," filed on Feb. 24, 2016; each of which is hereby incorporated herein by reference in its entirety for all purposes.

This application is also related to U.S. patent application Ser. No. 15/616,337, filed Jun. 7, 2017, and titled "SYSTEMS AND METHODS FOR MANAGING CONTAINERS IN A NETWORK OF MOVING THINGS," the entirety of which is hereby incorporated herein by reference for all purposes.

BACKGROUND

Current communication networks are unable to adequately support communication environments involving mobile and static nodes. As a non-limiting example, current communication networks are unable to adequately support a network comprising a complex array of both moving and static nodes (e.g., the Internet of moving things, autonomous vehicle networks, etc.). Limitations and disadvantages of conventional methods and systems will become apparent to one of skill in the art, through comparison of such approaches with some aspects of the present methods and systems set forth in the remainder of this disclosure with reference to the drawings.

SUMMARY

Figure 1:
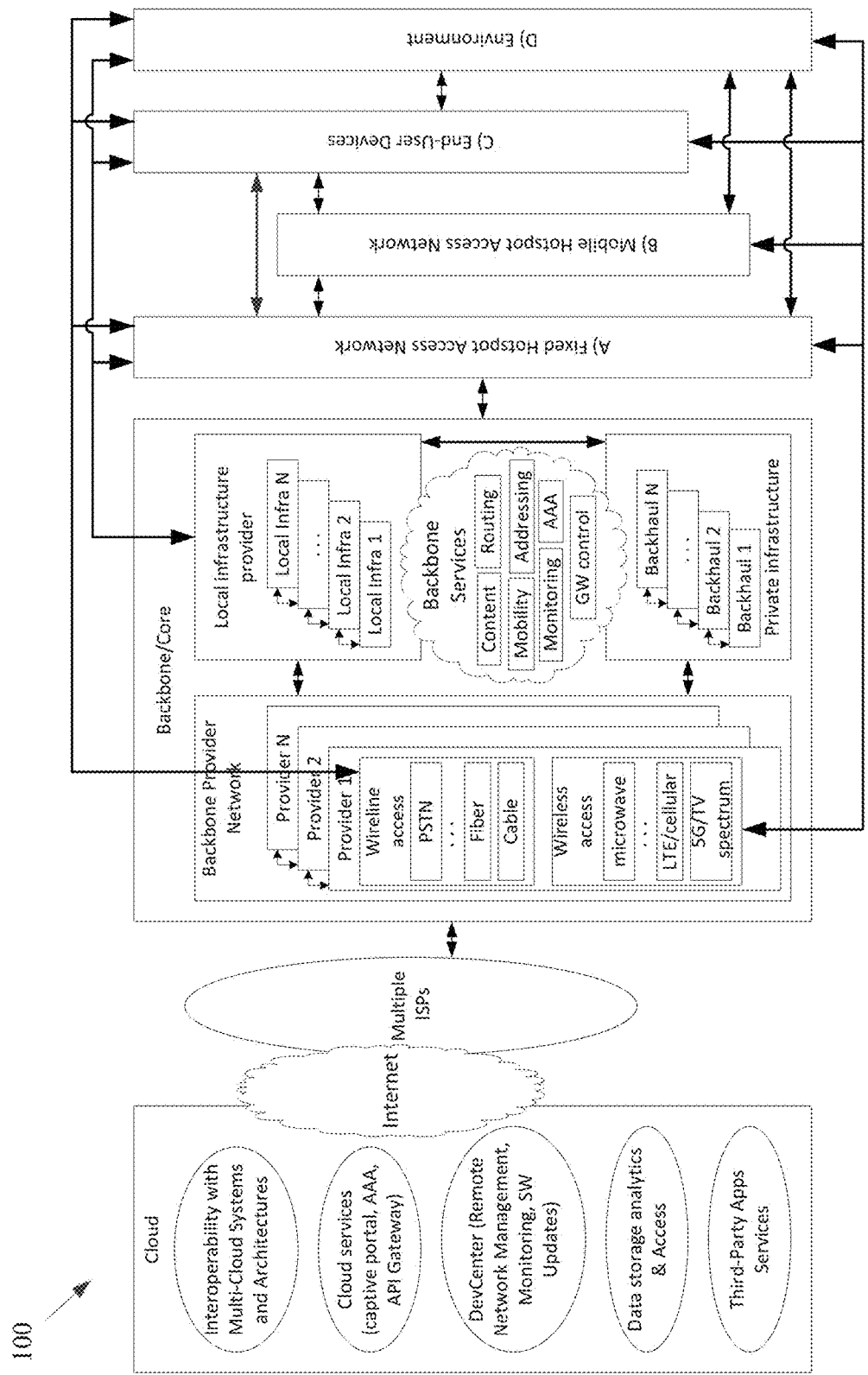
FIG. 1 shows a block diagram of a communication network, in accordance with various aspects of this disclosure.

Various aspects of this disclosure provide communication network architectures, systems and methods for supporting a network of mobile nodes. As a non-limiting example, various aspects of this disclosure provide communication network architectures, systems, and methods for managing resource utilization in a network of moving things, for example including autonomous vehicles.

DETAILED DESCRIPTION OF VARIOUS ASPECTS OF THE DISCLOSURE

As utilized herein the terms "circuits" and "circuitry" refer to physical electronic components (i.e., hardware) and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc. Similarly, the term "module" may, for example, refer to a physical electronic components (i.e., hardware) and any software and/or firmware ("code") that may configure the hardware, be executed by the hardware, and or otherwise be associated with the hardware.

As utilized herein, circuitry is "operable" to perform a function whenever the circuitry comprises the necessary hardware and code (if any is necessary) to perform the function, regardless of whether performance of the function is disabled, or not enabled (e.g., by a user-configurable setting, factory setting or trim, etc.).

As utilized herein, "and/or" means any one or more of the items in the list joined by "and/or". As an example, "x and/or y" means any element of the three-element set {(x), (y), (x, y)}. That is, "x and/or y" means "one or both of x and y." As another example, "x, y, and/or z" means any element of the seven-element set {(x), (y), (z), (x, y), (x, z), (y, z), (x, y, z)}. That is, "x, y, and/or z" means "one or more of x, y, and z." As utilized herein, the terms "e.g.," and "for example," "exemplary," and the like set off lists of one or more non-limiting examples, instances, or illustrations.

The terminology used herein is for the purpose of describing particular examples only and is not intended to be limiting of the disclosure. As used herein, the singular forms are intended to include the plural forms as well, unless the context clearly indicates otherwise. It will be further understood that the terms "comprises," "includes," "comprising," "including," "has," "have," "having," and the like when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present disclosure. Similarly, various spatial terms, such as "upper," "lower," "side," and the like, may be used in distinguishing one element from another element in a relative manner. It should be understood, however, that components may be oriented in different manners, for example an electronic device may be turned sideways so that its "top" surface is facing horizontally and its "side" surface is facing vertically, without departing from the teachings of the present disclosure.

With the proliferation of the mobile and/or static things (e.g., devices, machines, people, etc.) and logistics for such things to become connected to each other (e.g., in the contexts of smart logistics, transportation, environmental sensing, etc.), a platform that is for example always-on, robust, scalable and secure that is capable of providing connectivity, services and Internet access to such things (or objects), anywhere and anytime is desirable. Efficient power utilization within the various components of such system is also desirable.

Accordingly, various aspects of the present disclosure provide a fully-operable, always-on, responsive, robust, scalable, secure platform/system/architecture to provide connectivity, services and Internet access to all mobile things and/or static things (e.g., devices, machines, people, access points, end user devices, sensors, etc.) anywhere and anytime, while operating in an energy-efficient manner.

Various aspects of the present disclosure provide a platform that is flexibly configurable and adaptable to the various requirements, features, and needs of different environments, where each environment may be characterized by a respective level of mobility and density of mobile and/or static things, and the number and/or types of access to those things. Characteristics of various environments may, for example, include high mobility of nodes (e.g., causing contacts or connections to be volatile), high number of neighbors, high number of connected mobile users, mobile access points, availability of multiple networks and technologies (e.g., sometimes within a same area), etc. For example, the mode of operation of the platform may be flexibly adapted from environment to environment, based on each environment's respective requirements and needs, which may be different from other environments. Additionally for example, the platform may be flexibly optimized (e.g., at design/installation time and/or in real-time) for different purposes (e.g., to reduce the latency, increase throughput, reduce power consumption, load balance, increase reliability, make more robust with regard to failures or other disturbances, etc.), for example based on the content, service or data that the platform provides or handles within a particular environment.

In accordance with various aspects of the present disclosure, many control and management services (e.g., mobility, security, routing, etc.) are provided on top of the platform (e.g., directly, using control overlays, using containers, etc.), such services being compatible with the services currently deployed on top of the Internet or other communication network(s).

The communication network (or platform), in whole or in part, may for example be operated in public and/or private modes of operation, for example depending on the use case. The platform may, for example, operate in a public or private mode of operation, depending on the use-case (e.g., public Internet access, municipal environment sensing, fleet operation, etc.).

Additionally for example, in an implementation in which various network components are mobile, the transportation and/or signal control mechanisms may be adapted to serve the needs of the particular implementation. Also for example, wireless transmission power and/or rate may be adapted (e.g., to mitigate interference, to reduce power consumption, to extend the life of network components, etc.

Various example implementations of a platform, in accordance with various aspects of the present disclosure, are capable of connecting different subsystems, even when various other subsystems that may normally be utilized are unavailable. For example, the platform may comprise various built-in redundancies and fail-recovery mechanisms. For example, the platform may comprise a self-healing capability, self-configuration capability, self-adaptation capability, etc. The protocols and functions of the platform may, for example, be prepared to be autonomously and smoothly configured and adapted to the requirements and features of different environments characterized by different levels of mobility and density of things (or objects), the number/types of access to those things. For example, various aspects of the platform may gather context parameters that can influence any or all decisions. Such parameters may, for example, be derived locally, gathered from a neighborhood, fixed APs, the Cloud, etc. Various aspects of the platform may also, for example, ask for historical information to feed any of the decisions, where such information can be derived from historical data, from surveys, from simulators, etc. Various aspects of the platform may additionally, for example, probe or monitor decisions made throughout the network, for example to evaluate the network and/or the decisions themselves in real-time. Various aspects of the platform may further, for example, enforce the decisions in the network (e.g., after evaluating the probing results). Various aspects of the platform may, for example, establish thresholds to avoid any decision that is to be constantly or repeatedly performed without any significant advantage (e.g., technology change, certificate change, IP change, etc.). Various aspects of the platform may also, for example, learn locally (e.g., with the decisions performed) and dynamically update the decisions.

In addition to (or instead of) failure robustness, a platform may utilize multiple connections (or pathways) that exist between distinct sub-systems or elements within the same sub-system, to increase the robustness and/or load-balancing of the system.

The following discussion will present examples of the functionality performed by various example subsystems of the communication network. It should be understood that the example functionality discussed herein need not be performed by the particular example subsystem or by a single subsystem. For example, the subsystems present herein may interact with each other, and data or control services may be deployed either in a centralized way, or having their functionalities distributed among the different subsystems, for example leveraging the cooperation between the elements of each subsystem.

Various aspects of the present disclosure provide a communication network (e.g., a city-wide vehicular network, a shipping port-sized vehicular network, a campus-wide vehicular network, etc.) that utilizes vehicles (e.g., automobiles, buses, trucks, boats, forklifts, human-operated vehicles, autonomous and/or remote controlled vehicles, etc.) as Wi-Fi hotspots. Note that Wi-Fi is generally used throughout this discussion as an example, but the scope of various aspects of this disclosure is not limited thereto. For example, other wireless LAN technologies, PAN technologies, MAN technologies, etc., may be utilized. Such utilization may, for example, provide cost-effective ways to gather substantial amounts of urban data, and provide for the efficient offloading of traffic from congested cellular networks (or other networks). In controlled areas (e.g., ports, harbors, etc.) with many vehicles, a communication network in accordance with various aspects of this disclosure may expand the wireless coverage of existing enterprise Wi-Fi networks, for example providing for real-time communication with vehicle drivers (e.g., human, computer-controlled, etc.) and other mobile employees without the need for SIM cards or cellular (or other network) data plans.

Vehicles may have many advantageous characteristics that make them useful as Wi-Fi (or general wireless) hotspots. For example, vehicles generally have at least one battery, vehicles are generally densely spread over the city at street level and/or they are able to establish many contacts with each other in a controlled space, and vehicles can communicate with 10x the range of normal Wi-Fi in the 5.9 GHz frequency band, reserved for intelligent transportation systems in the EU, the U.S., and elsewhere. Note that the scope of this disclosure is not limited to such 5.9 GHz wireless communication. Further, vehicles are able to effectively expand their coverage area into a swath over a period of time, enabling a single vehicle access point to interact with substantially more data sources over the period of time.

In accordance with various aspects of the present disclosure, an affordable multi-network on-board unit (OBU) is presented. Note that the OBU may also be referred to herein as a mobile access point, Mobile AP, MAP, etc. The OBU may, for example, comprise a plurality of networking interfaces (e.g., Wi-Fi, 802.11p, 4G, Bluetooth, UWB, etc.). The OBU may, for example, be readily installed in or on private and/or public vehicles (e.g., individual user vehicles, vehicles of private fleets, vehicles of public fleets, etc.). The OBU may, for example, be installed in transportation fleets, waste management fleets, law enforcement fleets, emergency services, road maintenance fleets, taxi fleets, aircraft fleets, etc. The OBU may, for example, be installed in or on a vehicle or other structure with free mobility or relatively limited mobility. The OBU may also, for example, be carried by a person or service animal, mounted to a bicycle, mounted to a moving machine in general, mounted to a container, etc.

The OBUs may, for example, operate to connect passing vehicles to the wired infrastructure of one or more network providers, telecom operators, etc. In accordance with the architecture, hardware, and software functionality discussed herein, vehicles and fleets can be connected not just to the cellular networks (or other wide area or metropolitan area networks, etc.) and existing Wi-Fi hotspots spread over a city or a controlled space, but also to other vehicles (e.g., utilizing multi-hop communications to a wired infrastructure, single or multi-hop peer-to-peer vehicle communication, etc.). The vehicles and/or fleets may, for example, form an overall mesh of communication links, for example including the OBUs and also fixed Access Points (APs) connected to the wired infrastructure (e.g., a local infrastructure, etc.). Note that OBUs herein may also be referred to as "Mobile APs," "mobile hotspots," "MAPs," etc. Also note that fixed access points may also be referred to herein as Road Side Units (RSUs), Fixed APs, FAPs, etc.

In an example implementation, the OBUs may communicate with the Fixed APs utilizing a relatively long-range protocol (e.g., 802.11p, etc.), and the Fixed APs may, in turn, be hard wired to the wired infrastructure (e.g., via cable, tethered optical link, etc.). Note that Fixed APs may also, or alternatively, be coupled to the infrastructure via wireless link (e.g., 802.11p, etc.). Additionally, clients or user devices may communicate with the OBUs using one or more relatively short-range protocols (e.g., Wi-Fi, Bluetooth, UWB, etc.). The OBUs, for example having a longer effective wireless communication range than typical Wi-Fi access points or other wireless LAN/PAN access points (e.g., at least for links such as those based on 802.11p, etc.), are capable of substantially greater coverage areas than typical Wi-Fi or other wireless LAN/PAN access points, and thus fewer OBUs are necessary to provide blanket coverage over a geographical area.

The OBU may, for example, comprise a robust vehicular networking module (e.g., a connection manager) which builds on long-range communication protocol capability (e.g., 802.11p, etc.). For example, in addition to comprising 802.11p (or other long-range protocol) capability to communicate with Fixed APs, vehicles, and other nodes in the network, the OBU may comprise a network interface (e.g., 802.11a/b/g/n, 802.11ac, 802.11af, any combination thereof, etc.) to provide wireless local area network (WLAN) connectivity to end user devices, sensors, fixed Wi-Fi access points, etc. For example, the OBU may operate to provide in-vehicle Wi-Fi Internet access to users in and/or around the vehicle (e.g., a bus, train car, taxi cab, public works vehicle, etc.). The OBU may further comprise one or more wireless backbone communication interfaces (e.g., cellular network interfaces, etc.). Though in various example scenarios, a cellular network interface (or other wireless backbone communication interface) might not be the preferred interface for various reasons (e.g., cost, power, bandwidth, etc.), the cellular network interface may be utilized to provide connectivity in geographical areas that are not presently supported by a Fixed AP, may be utilized to provide a fail-over communication link, may be utilized for emergency communications, may be utilized to subscribe to local infrastructure access, etc. The cellular network interface may also, for example, be utilized to allow the deployment of solutions that are dependent on the cellular network operators.

An OBU, in accordance with various aspects of the present disclosure, may for example comprise a smart connection manager that can select the best available wireless link(s) (e.g., Wi-Fi, 802.11p, cellular, vehicle mesh, etc.) with which to access the Internet. The OBU may also, for example, provide geo-location capabilities (e.g., GPS, etc.), motion detection sensors to determine if the vehicle is in motion, and a power control subsystem (e.g., to ensure that the OBU does not deplete the vehicle battery, etc.). The OBU may, for example, comprise any or all of the sensors (e.g., environmental sensors, etc.) discussed herein.

The OBU may also, for example, comprise a manager that manages machine-to-machine data acquisition and transfer (e.g., in a real-time or delay-tolerant fashion) to and from the cloud. For example, the OBU may log and/or communicate information of the vehicles.

The OBU may, for example, comprise a connection and/or routing manager that operates to perform routing of communications in a vehicle-to-vehicle/vehicle-to-infrastructure multi-hop communication. A mobility manager (or controller, MC) may, for example, ensure that communication sessions persist over one or more handoff(s) (also referred to herein as a "handover" or "handovers") (e.g., between different Mobile APs, Fixed APs, base stations, hot spots, etc.), among different technologies (e.g., 802.11p, cellular, Wi-Fi, satellite, etc.), among different MCs (e.g., in a fail-over scenario, load redistribution scenario, etc.), across different interfaces (or ports), etc. Note that the MC may also be referred to herein as a Local Mobility Anchor (LMA), a Network Controller, etc. Note that the MC, or a plurality thereof, may for example be implemented as part of the backbone, but may also, or alternatively, be implemented as part of any of a variety of components or combinations thereof. For example, the MC may be implemented in a Fixed AP (or distributed system thereof), as part of an OBU (or a distributed system thereof), etc. Various non-limiting examples of system components and/or methods are provided in U.S. Provisional Application No. 62/222,098, filed Sep. 22, 2015, and titled "Systems and Method for Managing Mobility in a Network of Moving Things," the entire contents of which are hereby incorporated herein by reference. Note that in an example implementation including a plurality of MCs, such MCs may be co-located and/or may be geographically distributed.

Various aspects of the present disclosure also provide a cloud-based service-oriented architecture that handles the real-time management, monitoring and reporting of the network and clients, the functionalities required for data storage, processing and management, the Wi-Fi client authentication and Captive Portal display, etc.

A communication network (or component thereof) in accordance with various aspects of the present disclosure may, for example, support a wide range of smart city applications (or controlled scenarios, or connected scenarios, etc.) and/or use-cases, as described herein.

For example, an example implementation may operate to turn each vehicle (e.g., both public and private taxis, buses, trucks, etc.) into a Mobile AP (e.g., a mobile Wi-Fi hotspot), offering Internet access to employees, passengers and mobile users travelling in the city, waiting in bus stops, sitting in parks, etc. Moreover, through an example vehicular mesh network formed between vehicles and/or fleets of vehicles, an implementation may be operable to offload cellular traffic through the mobile Wi-Fi hotspots and/or fixed APs (e.g., 802.11p-based APs) spread over the city and connected to the wired infrastructure of public or private telecom operators in strategic places, while ensuring the widest possible coverage at the lowest possible cost.

An example implementation (e.g., of a communication network and/or components thereof) may, for example, be operable as a massive urban scanner that gathers large amounts of data (e.g., continuously) on-the-move, actionable or not, generated by a myriad of sources spanning from the in-vehicle sensors or On Board Diagnostic System port (e.g., OBD2, etc.), interface with an autonomous vehicle driving system, external Wi-Fi/Bluetooth-enabled sensing units spread over the city, devices of vehicles' drivers and passengers (e.g., information characterizing such devices and/or passengers, etc.), positioning system devices (e.g., position information, velocity information, trajectory information, travel history information, etc.), etc.

Depending on the use case, the OBU may for example process (or computer, transform, manipulate, aggregate, summarize, etc.) the data before sending the data from the vehicle, for example providing the appropriate granularity (e.g., value resolution) and sampling rates (e.g., temporal resolution) for each individual application. For example, the OBU may, for example, process the data in any manner deemed advantageous by the system. The OBU may, for example, send the collected data (e.g., raw data, preprocessed data, information of metrics calculated based on the collected data, etc.) to the Cloud (e.g., to one or more networked servers coupled to any portion of the network) in an efficient and reliable manner to improve the efficiency, environmental impact and social value of municipal city operations and transportation services. Various example use cases are described herein.

In an example scenario in which public buses are moving along city routes and/or taxis are performing their private transportation services, the OBU is able to collect large quantities of real-time data from the positioning systems (e.g., GPS, etc.), from accelerometer modules, etc. The OBU may then, for example, communicate such data to the Cloud, where the data may be processed, reported and viewed, for example to support such public or private bus and/or taxi operations, for example supporting efficient remote monitoring and scheduling of buses and taxis, respectively.

In an example implementation, small cameras (or other sensors) may be coupled to small single-board computers (SBCs) that are placed above the doors of public buses to allow capturing image sequences of people entering and leaving buses, and/or on stops along the bus routes in order to estimate the number of people waiting for a bus. Such data may be gathered by the OBU in order to be sent to the Cloud. With such data, public transportation systems may detect peaks; overcrowded buses, routes and stops; underutilized buses, routes and stops; etc., enabling action to be taken in real-time (e.g., reducing bus periodicity to decrease fuel costs and $CO_2$ emissions where and when passenger flows are smaller, etc.) as well as detecting systematic transportation problems.

An OBU may, for example, be operable to communicate with any of a variety of Wi-Fi-enabled sensor devices equipped with a heterogeneous collection of environmental sensors. Such sensors may, for example, comprise noise sensors (microphones, etc.), gas sensors (e.g., sensing CO, $NO_2$, $O_3$, volatile organic compounds (or VOCs), $CO_2$, etc.), smoke sensors, pollution sensors, meteorological sensors (e.g., sensing temperature, humidity, luminosity, particles, solar radiation, wind speed (e.g., anemometer), wind direction, rain (e.g., a pluviometer), optical scanners, biometric scanners, cameras, microphones, etc.). Such sensors may also comprise sensors associated with users (e.g., vehicle operators or passengers, passersby, etc.) and/or their personal devices (e.g., smart phones or watches, biometrics sensors, wearable sensors, implanted sensors, etc.). Such sensors may, for example, comprise sensors and/or systems associated with on-board diagnostic (OBD) units for vehicles, autonomous vehicle driving systems, etc. Such sensors may, for example, comprise positioning sensors (e.g., GPS sensors, Galileo sensors, GLONASS sensors, etc.). Note that such positioning sensors may be part of a vehicle's operational system (e.g., a local human-controlled vehicle, an autonomous vehicle, a remote human-controlled vehicle, etc.) Such sensors may, for example, comprise container sensors (e.g., garbage can sensors, shipping container sensors, container environmental sensors, container tracking sensors, etc.).

Once a vehicle enters the vicinity of such a sensor device, a wireless link may be established, so that the vehicle (or OBU thereof) can collect sensor data from the sensor device and upload the collected data to a database in the Cloud. The appropriate action can then be taken. In an example waste management implementation, several waste management (or collection) trucks may be equipped with OBUs that are able to periodically communicate with sensors installed on containers in order to gather information about waste level, time passed since last collection, etc. Such information may then sent to the Cloud (e.g., to a waste management application coupled to the Internet, etc.) through the vehicular mesh network, in order to improve the scheduling and/or routing of waste management trucks. Note that various sensors may always be in range of the Mobile AP (e.g., vehicle-mounted sensors). Note that the sensor may also (or alternatively) be mobile (e.g., a sensor mounted to another vehicle passing by a Mobile AP or Fixed AP, a drone-mounted sensor, a pedestrian-mounted sensor, etc.).

In an example implementation, for example in a controlled space (e.g., a port, harbor, airport, factory, plantation, mine, etc.) with many vehicles, machines and employees, a communication network in accordance with various aspects of the present disclosure may expand the wireless coverage of enterprise and/or local Wi-Fi networks, for example without resorting to a Telco-dependent solution based on SIM cards or cellular fees. In such an example scenario, apart from avoiding expensive cellular data plans, limited data rate and poor cellular coverage in some places, a communication network in accordance with various aspects of the present disclosure is also able to collect and/or communicate large amounts of data, in a reliable and real-time manner, where such data may be used to optimize harbor logistics, transportation operations, etc.

For example in a port and/or harbor implementation, by gathering real-time information on the position, speed, fuel consumption and $CO_2$ emissions of the vehicles, the communication network allows a port operator to improve the coordination of the ship loading processes and increase the throughput of the harbor. Also for example, the communication network enables remote monitoring of drivers' behaviors, behaviors of autonomous vehicles and/or control systems thereof, trucks' positions and engines' status, and then be able to provide real-time notifications to drivers (e.g., to turn on/off the engine, follow the right route inside the harbor, take a break, etc.), for example human drivers and/or automated vehicle driving systems, thus reducing the number and duration of the harbor services and trips. Harbor authorities may, for example, quickly detect malfunctioning trucks and abnormal trucks' circulation, thus avoiding accidents in order to increase harbor efficiency, security, and safety. Additionally, the vehicles can also connect to Wi-Fi access points from harbor local operators, and provide Wi-Fi Internet access to vehicles' occupants and surrounding harbor employees, for example allowing pilots to save time by filing reports via the Internet while still on the water.

FIG. 1 shows a block diagram of a communication network 100, in accordance with various aspects of this disclosure. Any or all of the functionality discussed herein may be performed by any or all of the example components of the example network 100. Also, the example network 100 may, for example, share any or all characteristics with the other example methods, systems, networks and/or network components 200, 300, 400, 500-570, 600, 700, 800, 900, 1000, and 1100, discussed herein.

The example network 100, for example, comprises a Cloud that may, for example comprise any of a variety of network level components. The Cloud may, for example, comprise any of a variety of server systems executing applications that monitor and/or control components of the network 100. Such applications may also, for example, manage the collection of information from any of a large array of networked information sources, many examples of which are discussed herein. The Cloud (or a portion thereof) may also be referred to, at times, as an API. For example, Cloud (or a portion thereof) may provide one or more application programming interfaces (APIs) which other devices may use for communicating/interacting with the Cloud.

An example component of the Cloud may, for example, manage interoperability with various multi-cloud systems and architectures. Another example component (e.g., a Cloud service component) may, for example, provide various cloud services (e.g., captive portal services, authentication, authorization, and accounting (AAA) services, API Gateway services, etc.). An additional example component (e.g., a DevCenter component) may, for example, provide network monitoring and/or management functionality, manage the implementation of software updates, etc. A further example component of the Cloud may manage data storage, data analytics, data access, etc. A still further example component of the Cloud may include any of a variety of third-partly applications and services.

The Cloud may, for example, be coupled to the Backbone/Core Infrastructure of the example network 100 via the Internet (e.g., utilizing one or more Internet Service Providers). Though the Internet is provided by example, it should be understood that scope of the present disclosure is not limited thereto.

The Backbone/Core may, for example, comprise any one or more different communication infrastructure components. For example, one or more providers may provide backbone networks or various components thereof. As shown in the example network 100 illustrated in FIG. 1, a Backbone provider may provide wireline access (e.g., PSTN, fiber, cable, etc.). Also for example, a Backbone provider may provide wireless access (e.g., Microwave, LTE/Cellular, 5G/TV Spectrum, etc.).

The Backbone/Core may also, for example, comprise one or more Local Infrastructure Providers. The Backbone/Core may also, for example, comprise a private infrastructure (e.g., run by the network 100 implementer, owner, etc.). The Backbone/Core may, for example, provide any of a variety of Backbone Services (e.g., AAA, Mobility, Monitoring, Addressing, Routing, Content services, Gateway Control services, etc.).

The Backbone/Core Infrastructure may comprise any of a variety of characteristics, non-limiting examples of which are provided herein. For example, the Backbone/Core may be compatible with different wireless or wired technologies for backbone access. The Backbone/Core may also be adaptable to handle public (e.g., municipal, city, campus, etc.) and/or private (e.g., ports, campus, etc.) network infrastructures owned by different local providers, and/or owned by the network implementer or stakeholder. The Backbone/Core may, for example, comprise and/or interface with different Authentication, Authorization, and Accounting (AAA) mechanisms.

The Backbone/Core Infrastructure may, for example, support different modes of operation (e.g., L2 in port implementations, L3 in on-land public transportation implementations, utilizing any one or more of a plurality of different layers of digital IP networking, any combinations thereof, equivalents thereof, etc.) or addressing pools. The Backbone/Core may also for example, be agnostic to the Cloud provider(s) and/or Internet Service Provider(s). Additionally for example, the Backbone/Core may be agnostic to requests coming from any or all subsystems of the network 100 (e.g., Mobile APs or OBUs (On Board Units), Fixed APs or RSUs (Road Side Units), MCs (Mobility Controllers) or LMAs (Local Mobility Anchors) or Network Controllers, etc.) and/or third-party systems.

The Backbone/Core Infrastructure may, for example, comprise the ability to utilize and/or interface with different data storage/processing systems (e.g., MongoDB, MySql, Redis, etc.). The Backbone/Core Infrastructure may further, for example, provide different levels of simultaneous access to the infrastructure, services, data, etc.

Figure 2:
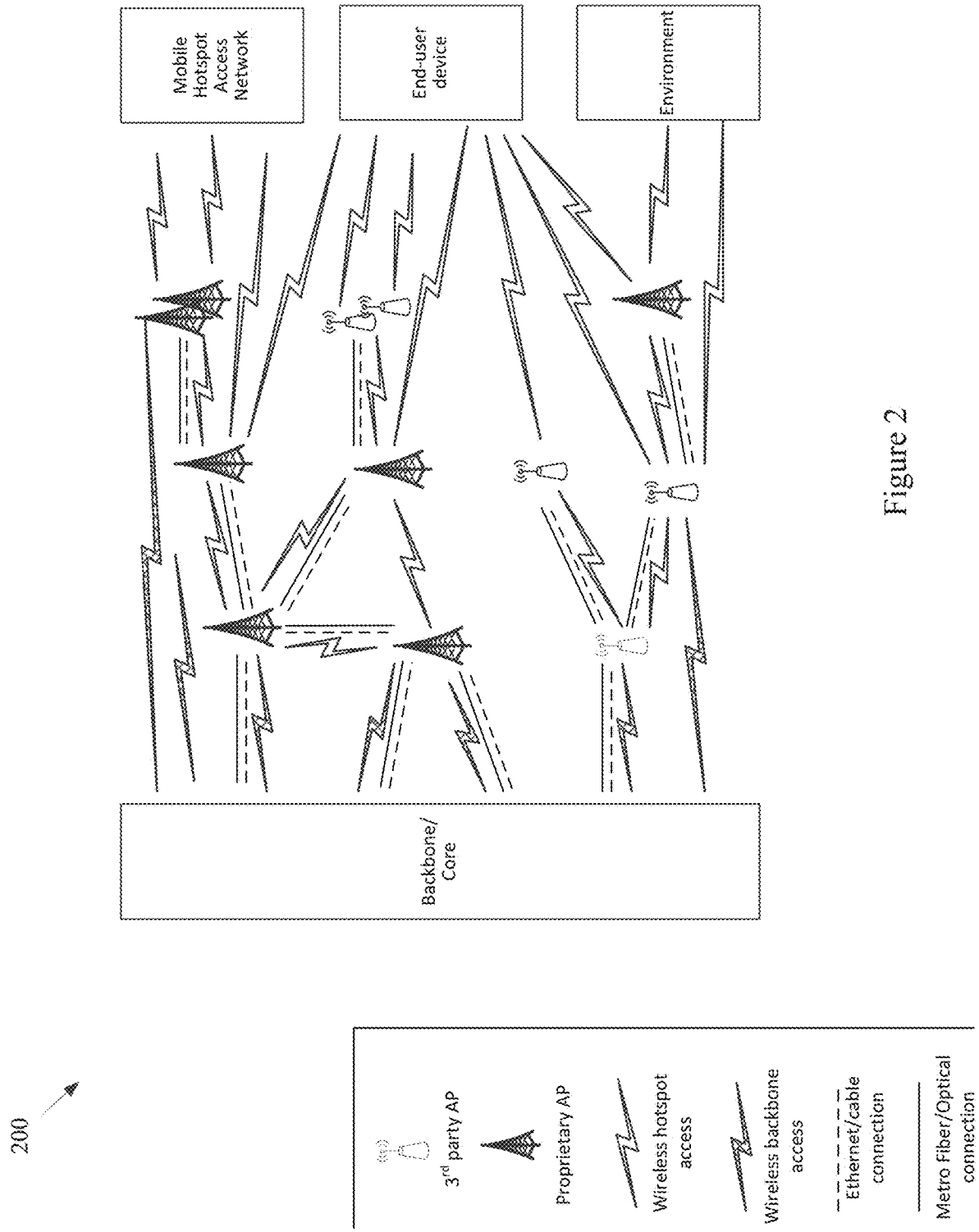
FIG. 2 shows a block diagram of a communication network, in accordance with various aspects of this disclosure.

The example network 100 may also, for example, comprise a Fixed Hotspot Access Network. Various example characteristics of such a Fixed Hotspot Access Network 200 are shown at FIG. 2. The example network 200 may, for example, share any or all characteristics with the other example methods, systems, networks and/or network components 100, 300, 400, 500-570, 600, 700, 800, 900, 1000, and 1100, discussed herein.

In the example network 200, the Fixed APs (e.g., the proprietary APs, the public third party APs, the private third party APs, etc.) may be directly connected to the local infrastructure provider and/or to the wireline/wireless backbone. Also for example, the example network 200 may comprise a mesh between the various APs via wireless technologies. Note, however, that various wired technologies may also be utilized depending on the implementation. As shown, different fixed hotspot access networks can be connected to a same backbone provider, but may also be connected to different respective backbone providers. In an example implementation utilizing wireless technology for backbone access, such an implementation may be relatively fault tolerant. For example, a Fixed AP may utilize wireless communications to the backbone network (e.g., cellular, 3G, LTE, other wide or metropolitan area networks, etc.) if the backhaul infrastructure is down. Also for example, such an implementation may provide for relatively easy installation (e.g., a Fixed AP with no cable power source that can be placed virtually anywhere).

In the example network 200, the same Fixed AP can simultaneously provide access to multiple Fixed APs, Mobile APs (e.g., vehicle OBUs, etc.), devices, user devices, sensors, things, etc. For example, a plurality of mobile hotspot access networks (e.g., OBU-based networks, etc.) may utilize the same Fixed AP. Also for example, the same Fixed AP can provide a plurality of simultaneous accesses to another single unit (e.g., another Fixed AP, Mobile AP, device, etc.), for example utilizing different channels, different radios, etc.).

Note that a plurality of Fixed APs may be utilized for fault-tolerance/fail-recovery purposes. In an example implementation, a Fixed AP and its fail-over AP may both be normally operational (e.g., in a same switch). Also for example, one or more Fixed APs may be placed in the network at various locations in an inactive or monitoring mode, and ready to become operational when needed (e.g., in response to a fault, in response to an emergency services need, in response to a data surge, etc.).

Referring back to FIG. 1, the example Fixed Hotspot Access Network is shown with a wireless communication link to a backbone provider (e.g., to one or more Backbone Providers and/or Local Infrastructure Providers), to a Mobile Hotspot Access Network, to one or more End User Devices, and to the Environment. Also, the example Fixed Hotspot Access Network is shown with a wired communication link to one or more Backbone Providers, to the Mobile Hotspot Access Network, to one or more End User Devices, and to the Environment. The Environment may comprise any of a variety of devices (e.g., in-vehicle networks, devices, and sensors; autonomous vehicle networks, devices, and sensors; maritime (or watercraft) and port networks, devices, and sensors; general controlled-space networks, devices, and sensors; residential networks, devices, and sensors; disaster recovery & emergency networks, devices, and sensors; military and aircraft networks, devices, and sensors; smart city networks, devices, and sensors; event (or venue) networks, devices, and sensors; underwater and underground networks, devices, and sensors; agricultural networks, devices, and sensors; tunnel (auto, subway, train, etc.) networks, devices, and sensors; parking networks, devices, and sensors; security and surveillance networks, devices, and sensors; shipping equipment and container networks, devices, and sensors; environmental control or monitoring networks, devices, and sensors; municipal networks, devices, and sensors; waste management networks, devices, and sensors, road maintenance networks, devices, and sensors, traffic management networks, devices, and sensors; advertising networks, devices and sensors; etc.).

Figure 3:
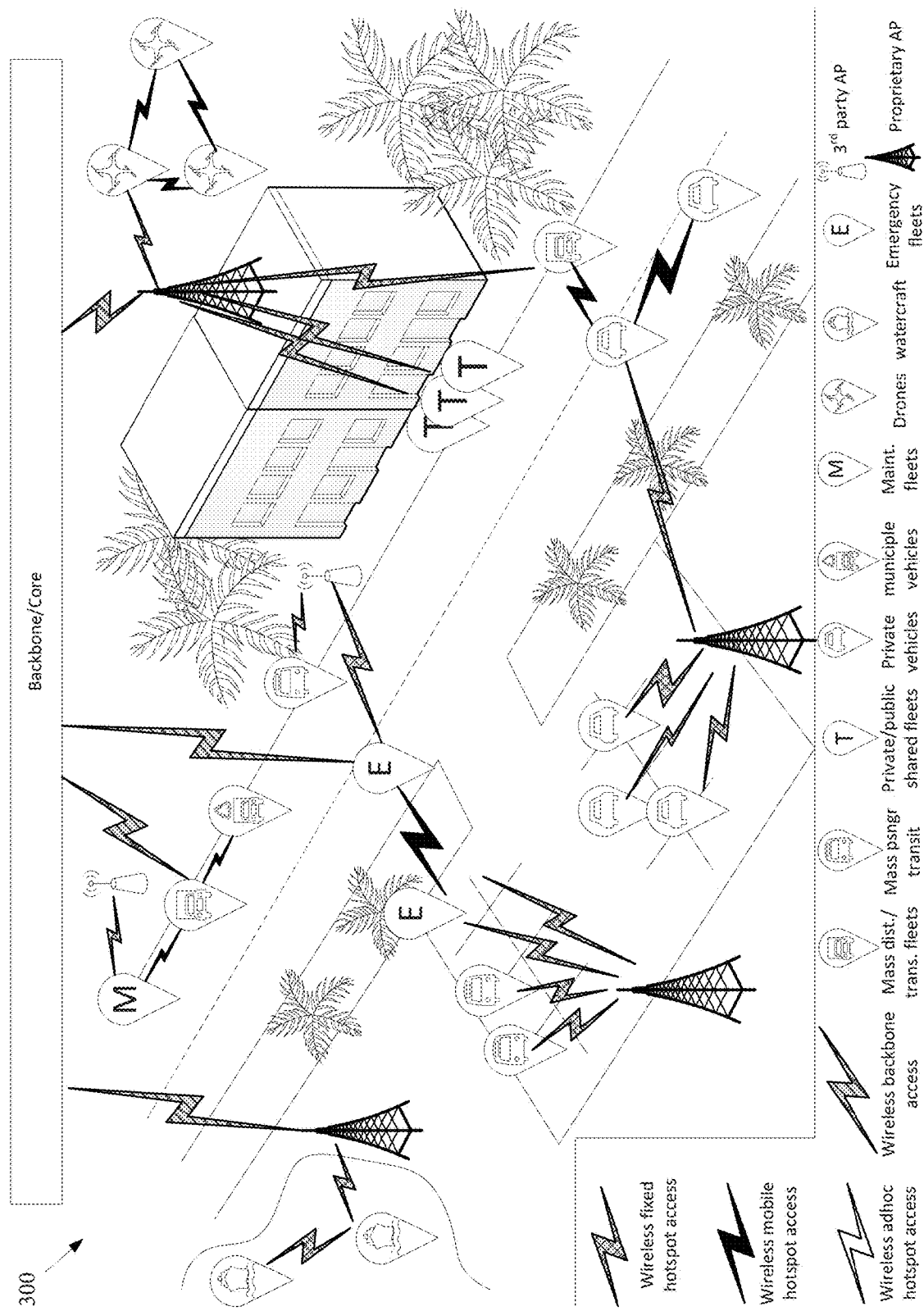
FIG. 3 shows a diagram of a metropolitan area network, in accordance with various aspects of this disclosure.

The example network 100 of FIG. 1 also comprises a Mobile Hotspot Access Network. Various example characteristics of such a Mobile Hotspot Access Network 300 are shown at FIG. 3. Note that various fixed network components (e.g., Fixed APs) are also illustrated. The example network 300 may, for example, share any or all characteristics with the other example methods, systems, networks and/or network components 100, 200, 400, 500-570, 600, 700, 800, 900, 1000, and 1100, discussed herein.

The example network 300 comprises a wide variety of Mobile APs (or hotspots) that provide access to user devices, provide for sensor data collection, provide multi-hop connectivity to other Mobile APs, etc. For example, the example network 300 comprises vehicles from different fleets (e.g., aerial, terrestrial, underground, (under)water, etc.). For example, the example network 300 comprises one or more mass distribution/transportation fleets, one or more mass passenger transportation fleets, private/public shared-user fleets, private vehicles, urban and municipal fleets, maintenance fleets, drones, watercraft (e.g., boats, ships, speedboats, tugboats, barges, etc.), emergency fleets (e.g., police, ambulance, firefighter, etc.), etc.

The example network 300, for example, shows vehicles from different fleets directly connected and/or mesh connected, for example using same or different communication technologies. The example network 300 also shows fleets simultaneously connected to different Fixed APs, which may or may not belong to different respective local infrastructure providers. As a fault-tolerance mechanism, the example network 300 may for example comprise the utilization of long-range wireless communication network (e.g., cellular, 3G, 4G, LTE, etc.) in vehicles if the local network infrastructure is down or otherwise unavailable. A same vehicle (e.g., Mobile AP or OBU) can simultaneously provide access to multiple vehicles, devices, things, etc., for example using a same communication technology (e.g., shared channels and/or different respective channels thereof) and/or using a different respective communication technology for each. Also for example, a same vehicle can provide multiple accesses to another vehicle, device, thing, etc., for example using a same communication technology (e.g., shared channels and/or different respective channels thereof, and/or using a different communication technology).

Additionally, multiple network elements may be connected together to provide for fault-tolerance or fail recovery, increased throughput, or to achieve any or a variety of a client's networking needs, many of examples of which are provided herein. For example, two Mobile APs (or OBUs) may be installed in a same vehicle, etc.

Referring back to FIG. 1, the example Mobile Hotspot Access Network is shown with a wireless communication link to a backbone provider (e.g., to one or more Backbone Providers and/or Local Infrastructure Providers), to a Fixed Hotspot Access Network, to one or more End User Device, and to the Environment (e.g., to any one of more of the sensors or systems discussed herein, any other device or machine, etc.). Though the Mobile Hotspot Access Network is not shown having a wired link to the various other components, there may (at least at times) be such a wired link, at least temporarily.

Figure 4:
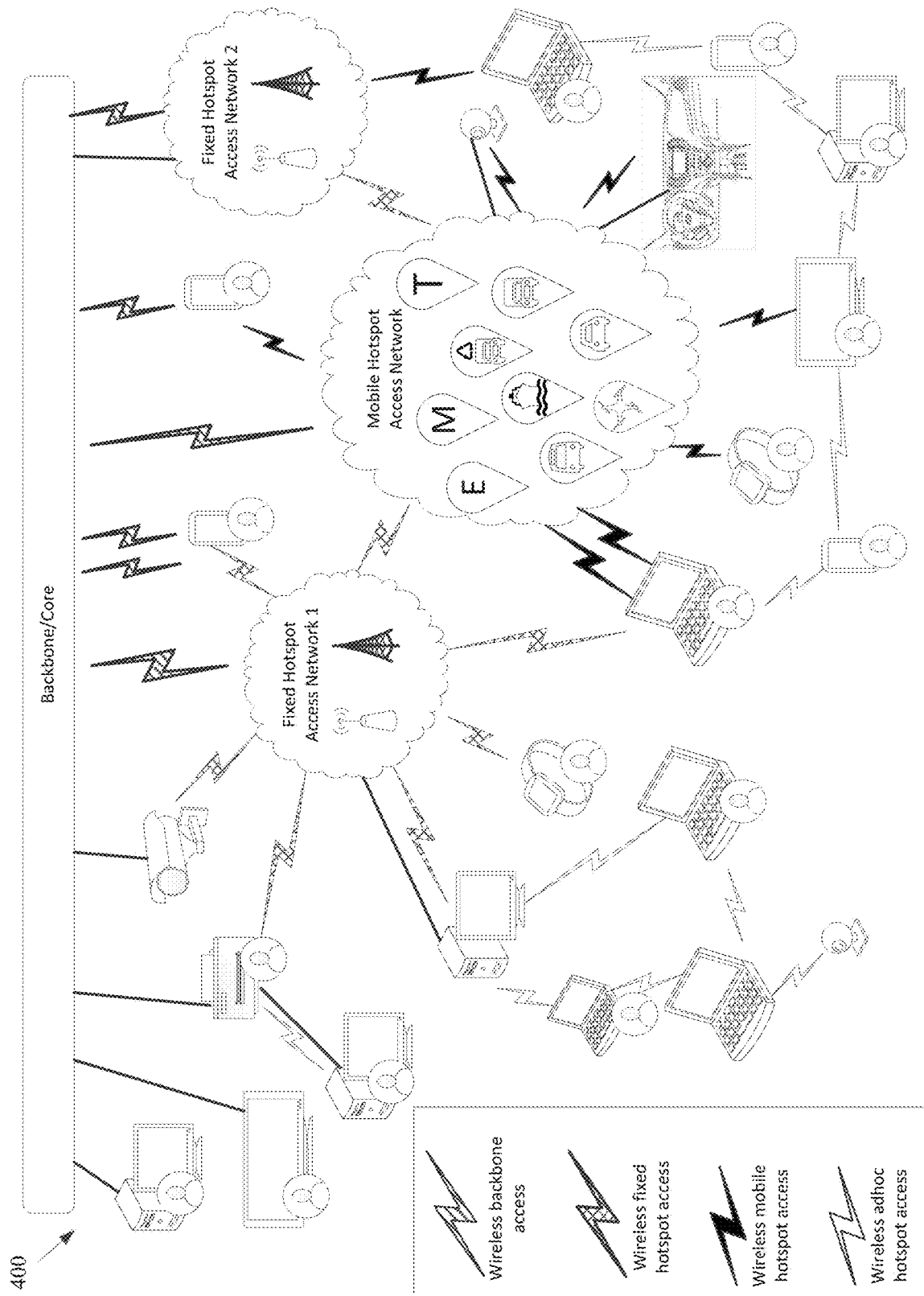
FIG. 4 shows a block diagram of a communication network, in accordance with various aspects of this disclosure.

The example network 100 of FIG. 1 also comprises a set of End-User Devices. Various example end user devices are shown at FIG. 4. Note that various other network components (e.g., Fixed Hotspot Access Networks, Mobile Hotspot Access Network(s), the Backbone/Core, etc.) are also illustrated. The example network 400 may, for example, share any or all characteristics with the other example methods, systems, networks and/or network components 100, 200, 300, 500-570, 600, 700, 800, 900, 1000, and 1100, discussed herein.

The example network 400 shows various mobile networked devices. Such network devices may comprise end-user devices (e.g., smartphones, tablets, smartwatches, laptop computers, webcams, personal gaming devices, personal navigation devices, personal media devices, personal cameras, health-monitoring devices, personal location devices, monitoring panels, printers, etc.). Such networked devices may also comprise any of a variety of devices operating in the general environment, where such devices might not for example be associated with a particular user (e.g. any or all of the sensor devices discussed herein, vehicle sensors, municipal sensors, fleet sensors road sensors, environmental sensors, security sensors, traffic sensors, waste sensors, meteorological sensors, any of a variety of different types of municipal or enterprise equipment, etc.). Any of such networked devices can be flexibly connected to distinct backbone, fixed hotspot access networks, mobile hotspot access networks, etc., using the same or different wired/wireless technologies.

A mobile device may, for example, operate as an AP to provide simultaneous access to multiple devices/things, which may then form ad hoc networks, interconnecting devices ultimately connected to distinct backbone networks, fixed hotspot, and/or mobile hotspot access networks. Devices (e.g., any or all of the devices or network nodes discussed herein) may, for example, have redundant technologies to access distinct backbone, fixed hotspot, and/or mobile hotspot access networks, for example for fault-tolerance and/or load-balancing purposes (e.g., utilizing multiple SIM cards, etc.). A device may also, for example, simultaneously access distinct backbone, fixed hotspot access networks, and/or mobile hotspot access networks, belonging to the same provider or to different respective providers. Additionally for example, a device can provide multiple accesses to another device/thing (e.g., via different channels, radios, etc.).

Referring back to FIG. 1, the example End-User Devices are shown with a wireless communication link to a backbone provider (e.g., to one or more Backbone Providers and/or Local Infrastructure Providers), to a Fixed Hotspot Access Network, to a Mobile Hotspot Access Network, and to the Environment. Also for example, the example End-User Devices are shown with a wired communication link to a backbone provider, to a Fixed Hotspot Access Network, to a Mobile Hotspot Access Network, and to the Environment.

Figure 5A:
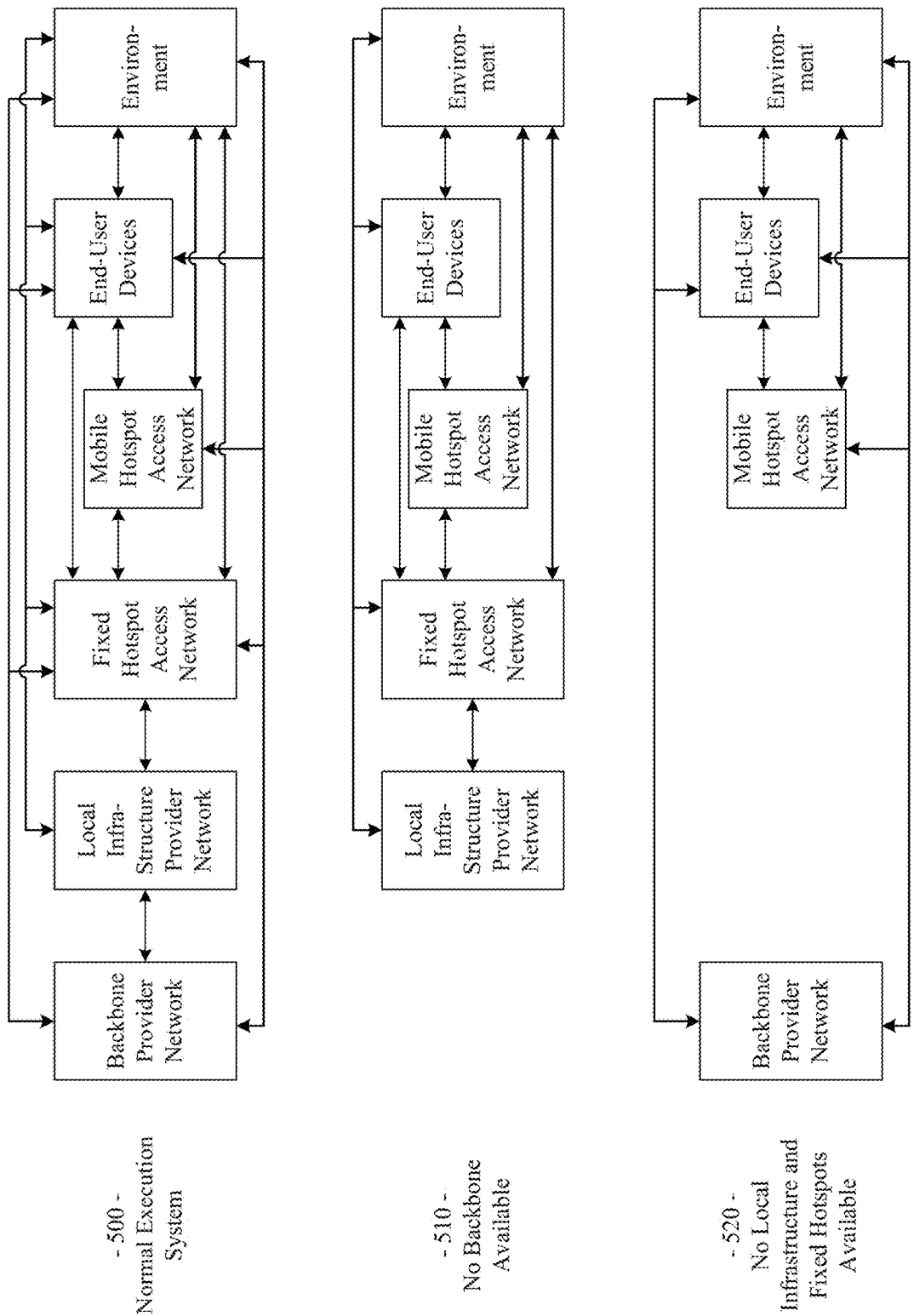
FIGS. 5A-5C show a plurality of network configurations illustrating the flexibility and/or and resiliency of a communication network, in accordance with various aspects of this disclosure.
Figure 5B:
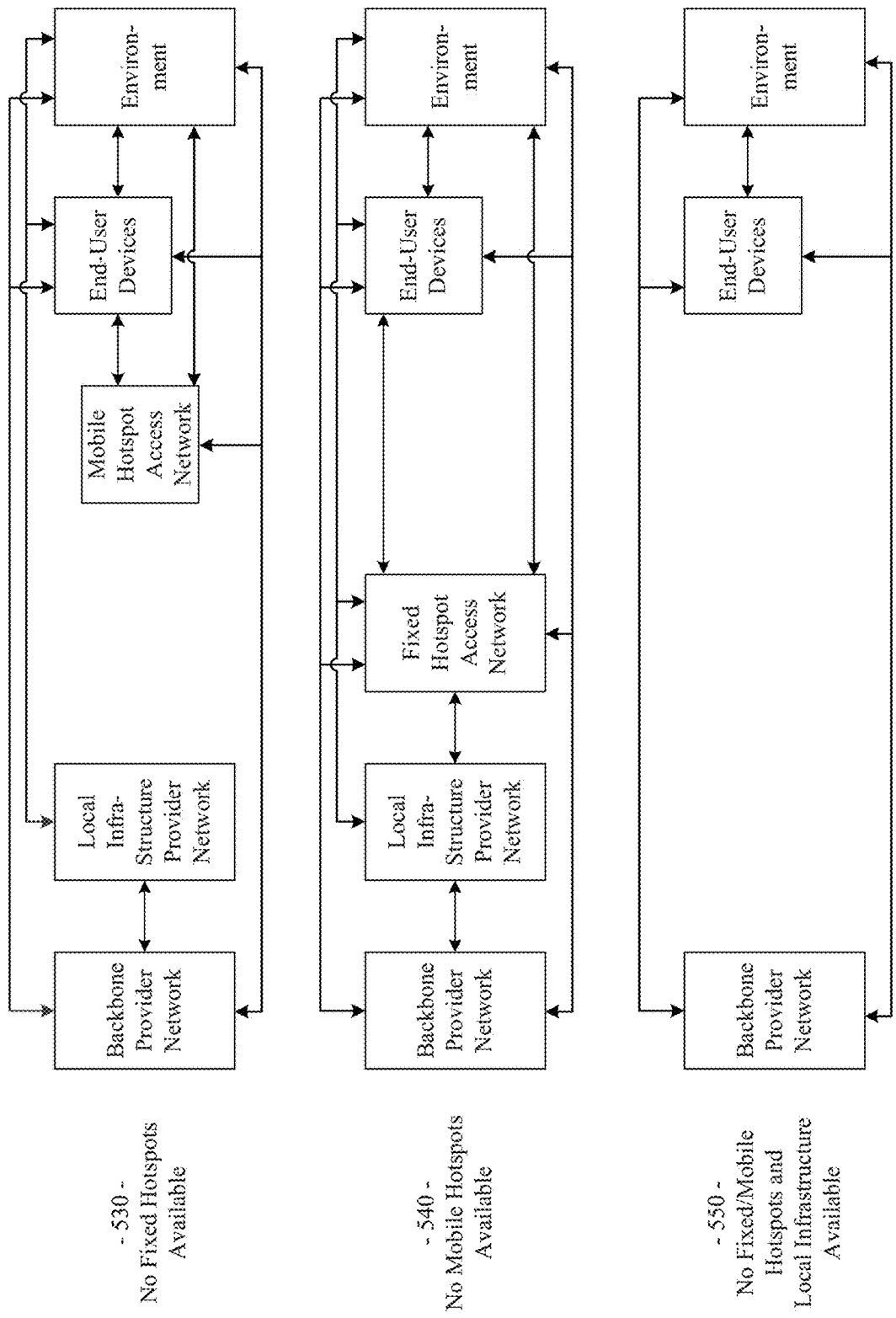
Figure 5C:
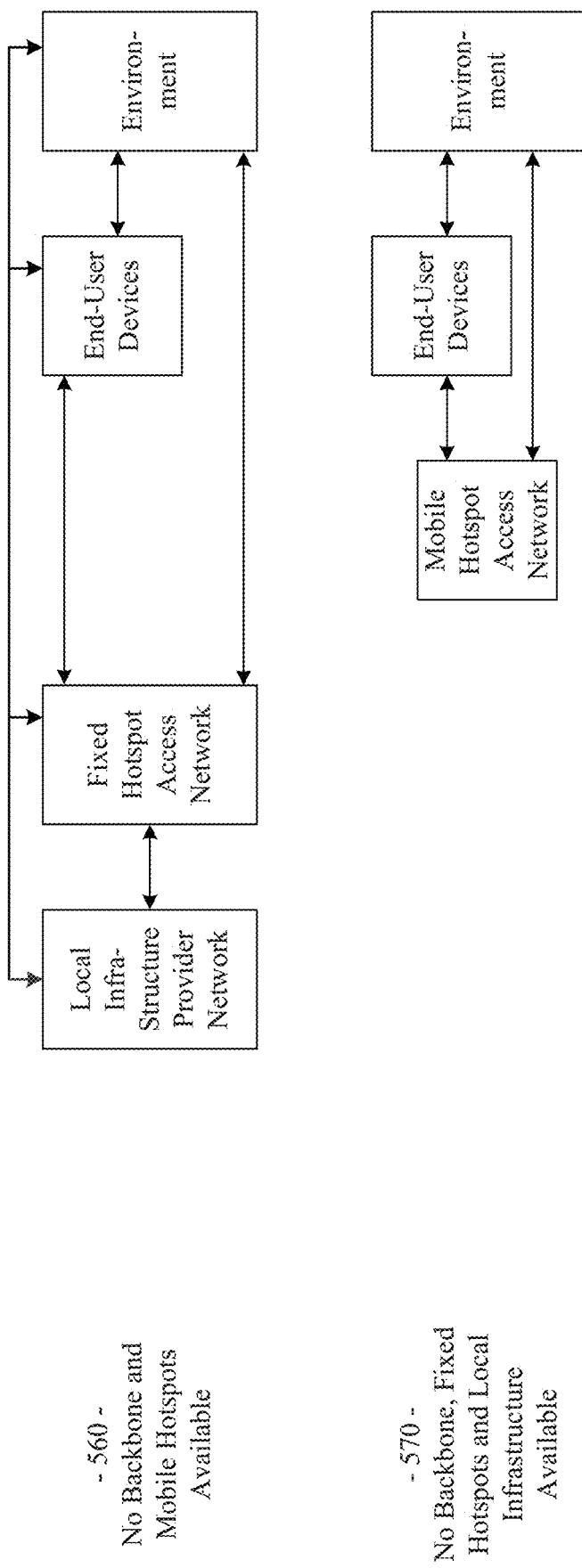

The example network 100 illustrated in FIG. 1 has a flexible architecture that is adaptable at implementation time (e.g., for different use cases) and/or adaptable in real-time, for example as network components enter and leave service. FIGS. 5A-5C illustrate such flexibility by providing example modes (or configurations). The example networks 500-570 may, for example, share any or all characteristics with the other example methods, systems, networks and/or network components 100, 200, 300, 400, 600, 700, 800, 900, 1000, and 1100, discussed herein. For example and without limitation, any or all of the communication links (e.g., wired links, wireless links, etc.) shown in the example networks 500-570 are generally analogous to similarly positioned communication links shown in the example network 100 of FIG. 1.

For example, various aspects of this disclosure provide communication network architectures, systems, and methods for supporting a dynamically configurable communication network comprising a complex array of both static and moving communication nodes (e.g., the Internet of moving things). For example, a communication network implemented in accordance with various aspects of the present disclosure may operate in one of a plurality of modalities comprising various fixed nodes, mobile nodes, and/or a combination thereof, which are selectable to yield any of a variety of system goals (e.g., increased throughput, reduced latency and packet loss, increased availability and robustness of the system, extra redundancy, increased responsiveness, increased security in the transmission of data and/or control packets, reduced number of configuration changes by incorporating smart thresholds (e.g., change of technology, change of certificate, change of IP, etc.), providing connectivity in dead zones or zones with difficult access, reducing the costs for maintenance and accessing the equipment for updating/upgrading, etc.). At least some of such modalities may, for example, be entirely comprised of fixed-position nodes, at least temporarily if not permanently.

For illustrative simplicity, many of the example aspects shown in the example system or network 100 of FIG. 1 (and other Figures herein) are omitted from FIGS. 5A-5C, but may be present. For example, the Cloud, Internet, and ISP aspects shown in FIG. 1 and in other Figures are not explicitly shown in FIGS. 5A-5C, but may be present in any of the example configurations (e.g., as part of the backbone provider network or coupled thereto, as part of the local infrastructure provider network or coupled thereto, etc.).

For example, the first example mode 500 is presented as a normal execution mode, for example a mode (or configuration) in which all of the components discussed herein are present. For example, the communication system in the first example mode 500 comprises a backbone provider network, a local infrastructure provider network, a fixed hotspot access network, a mobile hotspot access network, end-user devices, and environment devices.

As shown in FIG. 5A, and in FIG. 1 in more detail, the backbone provider network may be communicatively coupled to any or all of the other elements present in the first example mode 500 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via a wired link. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the first example mode 500 (or configuration) via one or more wireless links (e.g., RF link, non-tethered optical link, etc.). For example, the backbone provider network may be communicatively coupled to the fixed hotspot access network (or any component thereof), the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

Though not shown in the first example mode 500 (or any of the example modes of FIGS. 5A-5C), one or more servers may be communicatively coupled to the backbone provider network and/or the local infrastructure network. FIG. 1 provides an example of cloud servers being communicatively coupled to the backbone provider network via the Internet.

As additionally shown in FIG. 5A, and in FIG. 1 in more detail, the local infrastructure provider network may be communicatively coupled to any or all of the other elements present in the first example mode 500 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the first example mode 500 (or configuration) via one or more wireless links (e.g., RF link, non-tethered optical link, etc.). For example, the local infrastructure provider network may be communicatively coupled to the backbone provider network (or any component thereof), the fixed hotspot access network (or any component thereof), the mobile hotspot access network (or any component thereof), the end-user devices, and/or environment devices via one or more wireless links. Note that the communication link shown in the first example mode 500 of FIG. 5A between the local infrastructure provider network and the fixed hotspot access network may be wired and/or wireless.

The fixed hotspot access network is also shown in the first example mode 500 to be communicatively coupled to the mobile hotspot access network, the end-user devices, and/or environment devices via one or more wireless links. Many examples of such wireless coupling are provided herein. Additionally, the mobile hotspot access network is further shown in the first example mode 500 to be communicatively coupled to the end-user devices and/or environment devices via one or more wireless links. Many examples of such wireless coupling are provided herein. Further, the end-user devices are also shown in the first example mode 500 to be communicatively coupled to the environment devices via one or more wireless links. Many examples of such wireless coupling are provided herein. Note that in various example implementations any of such wireless links may instead (or in addition) comprise a wired (or tethered) link.

In the first example mode 500 (e.g., the normal mode), information (or data) may be communicated between an end-user device and a server (e.g., a computer system) via the mobile hotspot access network, the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network, the local infrastructure provider network, and/or the backbone provider network (e.g., skipping the mobile hotspot access network). Also for example, information communicated between an end user device and a server may be communicated via the backbone provider network (e.g., skipping the mobile hotspot access network, fixed hotspot access network, and/or local infrastructure provider network).

Similarly, in the first example mode 500 (e.g., the normal mode), information (or data) may be communicated between an environment device and a server via the mobile hotspot access network, the fixed hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network, the local infrastructure provider network, and/or the backbone provider network (e.g., skipping the mobile hotspot access network). Also for example, information communicated between an environment device and a server may be communicated via the backbone provider network (e.g., skipping the mobile hotspot access network, fixed hotspot access network, and/or local infrastructure provider network). Additionally for example, information communicated between an environment device and a server may be communicated via the local infrastructure provider network (e.g., skipping the mobile hotspot access network and/or fixed hotspot access network).

As discussed herein, the example networks presented herein are adaptively configurable to operate in any of a variety of different modes (or configurations). Such adaptive configuration may occur at initial installation and/or during subsequent controlled network evolution (e.g., adding or removing any or all of the network components discussed herein, expanding or removing network capacity, adding or removing coverage areas, adding or removing services, etc.). Such adaptive configuration may also occur in real-time, for example in response to real-time changes in network conditions (e.g., networks or components thereof being available or not based on vehicle or user-device movement, network or component failure, network or component replacement or augmentation activity, network overloading, etc.). The following example modes are presented to illustrate characteristics of various modes in which a communication system may operate in accordance with various aspects of the present disclosure. The following example modes will generally be discussed in relation to the first example mode 500 (e.g., the normal execution mode). Note that such example modes are merely illustrative and not limiting.

The second example mode (or configuration) 510 (e.g., a no backbone available mode) may, for example, share any or all characteristics with the first example mode 500, albeit without the backbone provider network and communication links therewith. For example, the communication system in the second example mode 510 comprises a local infrastructure provider network, a fixed hotspot access network, a mobile hotspot access network, end-user devices, and environment devices.

As shown in FIG. 5A, and in FIG. 1 in more detail, the local infrastructure provider network may be communicatively coupled to any or all of the other elements present in the second example mode 510 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the second example mode 510 (or configuration) via one or more wireless links (e.g., RF link, non-tethered optical link, etc.). For example, the local infrastructure provider network may be communicatively coupled to the fixed hotspot access network (or any component thereof), the mobile hotspot access network (or any component thereof), the end-user devices, and/or environment devices via one or more wireless links. Note that the communication link(s) shown in the second example mode 510 of FIG. 5A between the local infrastructure provider network and the fixed hotspot access network may be wired and/or wireless.

The fixed hotspot access network is also shown in the second example mode 510 to be communicatively coupled to the mobile hotspot access network, the end-user devices, and/or environment devices via one or more wireless links. Many examples of such wireless coupling are provided herein. Additionally, the mobile hotspot access network is further shown in the second example mode 510 to be communicatively coupled to the end-user devices and/or environment devices via one or more wireless links. Many examples of such wireless coupling are provided herein. Further, the end-user devices are also shown in the second example mode 510 to be communicatively coupled to the environment devices via one or more wireless links. Many examples of such wireless coupling are provided herein. Note that in various example implementations any of such wireless links may instead (or in addition) comprise a wired (or tethered) link.

In the second example mode 510 (e.g., the no backbone available mode), information (or data) may be communicated between an end-user device and a server (e.g., a computer, etc.) via the mobile hotspot access network, the fixed hotspot access network, and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network and/or the local infrastructure provider network (e.g., skipping the mobile hotspot access network). Also for example, information communicated between an end user device and a server may be communicated via the local infrastructure provider network (e.g., skipping the mobile hotspot access network and/or fixed hotspot access network).

Similarly, in the second example mode 510 (e.g., the no backbone available mode), information (or data) may be communicated between an environment device and a server via the mobile hotspot access network, the fixed hotspot access network, and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network and/or the local infrastructure provider network (e.g., skipping the mobile hotspot access network). Also for example, information communicated between an environment device and a server may be communicated via the local infrastructure provider network (e.g., skipping the mobile hotspot access network and/or fixed hotspot access network).

The second example mode 510 may be utilized for any of a variety of reasons, non-limiting examples of which are provided herein. For example, due to security and/or privacy goals, the second example mode 510 may be utilized so that communication access to the public Cloud systems, the Internet in general, etc., is not allowed. For example, all network control and management functions may be within the local infrastructure provider network (e.g., wired local network, etc.) and/or the fixed access point network.

In an example implementation, the communication system might be totally owned, operated and/or controlled by a local port authority. No extra expenses associated with cellular connections need be spent. For example, cellular connection capability (e.g., in Mobile APs, Fixed APs, end user devices, environment devices, etc.) need not be provided. Note also that the second example mode 510 may be utilized in a scenario in which the backbone provider network is normally available but is currently unavailable (e.g., due to server failure, due to communication link failure, due to power outage, due to a temporary denial of service, etc.).

The third example mode (or configuration) 520 (e.g., a no local infrastructure and fixed hotspots available mode) may, for example, share any or all characteristics with the first example mode 500, albeit without the local infrastructure provider network, the fixed hotspot access network, and communication links therewith. For example, the communication system in the third example mode 520 comprises a backbone provider network, a mobile hotspot access network, end-user devices, and environment devices.

As shown in FIG. 5A, and in FIG. 1 in more detail, the backbone provider network may be communicatively coupled to any or all of the other elements present in the third example mode 520 (or configuration) via one or more wired (or tethered) links. For example, the backbone provider network may be communicatively coupled to the end-user devices and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the third example mode 520 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links.

The mobile hotspot access network is further shown in the third example mode 520 to be communicatively coupled to the end-user devices and/or environment devices via one or more wireless links. Many examples of such wireless coupling are provided herein. Further, the end-user devices are also shown in the third example mode 520 to be communicatively coupled to the environment devices via one or more wireless links. Many examples of such wireless coupling are provided herein. Note that in various example implementations any of such wireless links may instead (or in addition) comprise a wired (or tethered) link.

In the third example mode 520 (e.g., the no local infrastructure and fixed hotspots available mode), information (or data) may be communicated between an end-user device and a server (e.g., a computer, etc.) via the mobile hotspot access network and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the backbone provider network (e.g., skipping the mobile hotspot access network).

Similarly, in the third example mode 520 (e.g., the no local infrastructure and fixed hotspots available mode), information (or data) may be communicated between an environment device and a server via the mobile hotspot access network and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the backbone provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the backbone provider network (e.g., skipping the mobile hotspot access network).

In the third example mode 520, all control/management functions may for example be implemented within the Cloud. For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The third example mode 520 may be utilized for any of a variety of reasons, non-limiting examples of which are provided herein. In an example implementation, the third example mode 520 may be utilized in an early stage of a larger deployment, for example deployment that will grow into another mode (e.g., the example first mode 500, example fourth mode 530, etc.) as more communication system equipment is installed. Note also that the third example mode 520 may be utilized in a scenario in which the local infrastructure provider network and fixed hotspot access network are normally available but are currently unavailable (e.g., due to equipment failure, due to communication link failure, due to power outage, due to a temporary denial of service, etc.).

The fourth example mode (or configuration) 530 (e.g., a no fixed hotspots available mode) may, for example, share any or all characteristics with the first example mode 500, albeit without the fixed hotspot access network and communication links therewith. For example, the communication system in the fourth example mode 530 comprises a backbone provider network, a local infrastructure provider network, a mobile hotspot access network, end-user devices, and environment devices.

As shown in FIG. 5B, and in FIG. 1 in more detail, the backbone provider network may be communicatively coupled to any or all of the other elements present in the fourth example mode 530 (or configuration) via one or more wired (or tethered) links. For example, the backbone provider network may be communicatively coupled to the local infrastructure provider network (or any component thereof), the end-user devices, and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5B, and in FIG. 1 in more detail, the backbone provider network may be communicatively coupled to any or all of the other elements present in the fourth example mode 530 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fourth example mode 530 (or configuration) via one or more wired (or tethered) links. For example, the local infrastructure provider network may be communicatively coupled to the backbone provider network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fourth example mode 530 (or configuration) via one or more wireless links (e.g., RF link, non-tethered optical link, etc.). For example, the local infrastructure provider network may be communicatively coupled to the backbone provider network (or any component thereof), the mobile hotspot access network (or any component thereof), the end-user devices, and/or environment devices via one or more wireless links.

The mobile hotspot access network is further shown in the fourth example mode 530 to be communicatively coupled to the end-user devices and/or environment devices via one or more wireless links. Many examples of such wireless coupling are provided herein. Further, the end-user devices are also shown in the fourth example mode 530 to be communicatively coupled to the environment devices via one or more wireless links. Many examples of such wireless coupling are provided herein.

In the fourth example mode 530 (e.g., the no fixed hotspots mode), information (or data) may be communicated between an end-user device and a server via the mobile hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network and/or the backbone provider network (e.g., skipping the mobile hotspot access network). Also for example, information communicated between an end user device and a server may be communicated via the backbone provider network (e.g., skipping the mobile hotspot access network and/or local infrastructure provider network).

Similarly, in the fourth example mode 530 (e.g., the no fixed hotspots available mode), information (or data) may be communicated between an environment device and a server via the mobile hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the mobile hotspot access network). Also for example, information communicated between an environment device and a server may be communicated via the backbone provider network (e.g., skipping the mobile hotspot access network and/or local infrastructure provider network). Additionally for example, information communicated between an environment device and a server may be communicated via the local infrastructure provider network (e.g., skipping the mobile hotspot access network and/or backbone provider network).

In the fourth example mode 530, in an example implementation, some of the control/management functions may for example be implemented within the local backbone provider network (e.g., within a client premises). For example, communication to the local infrastructure provider may be performed through the backbone provider network (or Cloud). Note that in a scenario in which there is a direct communication pathway between the local infrastructure provider network and the mobile hotspot access network, such communication pathway may be utilized.

For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The fourth example mode 530 may be utilized for any of a variety of reasons, non-limiting examples of which are provided herein. In an example implementation, the fourth example mode 530 may be utilized in an early stage of a larger deployment, for example a deployment that will grow into another mode (e.g., the example first mode 500, etc.) as more communication system equipment is installed. The fourth example mode 530 may, for example, be utilized in a scenario in which there is no fiber (or other) connection available for Fixed APs (e.g., in a maritime scenario, in a plantation scenario, etc.), or in which a Fixed AP is difficult to access or connect. For example, one or more Mobile APs of the mobile hotspot access network may be used as gateways to reach the Cloud. The fourth example mode 530 may also, for example, be utilized when a vehicle fleet and/or the Mobile APs associated therewith are owned by a first entity and the Fixed APs are owned by another entity, and there is no present agreement for communication between the Mobile APs and the Fixed APs. Note also that the fourth example mode 530 may be utilized in a scenario in which the fixed hotspot access network is normally available but are currently unavailable (e.g., due to equipment failure, due to communication link failure, due to power outage, due to a temporary denial of service, etc.).

The fifth example mode (or configuration) 540 (e.g., a no mobile hotspots available mode) may, for example, share any or all characteristics with the first example mode 500, albeit without the mobile hotspot access network and communication links therewith. For example, the communication system in the fifth example mode 540 comprises a backbone provider network, a local infrastructure provider network, a fixed hotspot access network, end-user devices, and environment devices.

As shown in FIG. 5B, and in FIG. 1 in more detail, the backbone provider network may be communicatively coupled to any or all of the other elements present in the fifth example mode 540 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via one or more wired links. Note that such a wired coupling may be temporary.

Also shown in FIG. 5B, and in FIG. 1 in more detail, the backbone provider network may be communicatively coupled to any or all of the other elements present in the fifth example mode 540 (or configuration) via one or more wireless links (e.g., RF link, non-tethered optical link, etc.). For example, the backbone provider network may be communicatively coupled to the fixed hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fifth example mode 540 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fifth example mode 540 (or configuration) via one or more wireless links (e.g., RF link, non-tethered optical link, etc.). For example, the local infrastructure provider network may be communicatively coupled to the backbone provider network, the fixed hotspot access network (or any component thereof), the end-user devices, and/or environment devices via one or more wireless links. Note that the communication link(s) shown in the fifth example mode 540 of FIG. 5B between the local infrastructure provider network and the fixed hotspot access network may be wired and/or wireless.

The fixed hotspot access network is also shown in the fifth example mode 540 to be communicatively coupled to the end-user devices and/or environment devices via one or more wireless links. Many examples of such wireless coupling are provided herein. Further, the end-user devices are also shown in the fifth example mode 540 to be communicatively coupled to the environment devices via one or more wireless links. Many examples of such wireless coupling are provided herein.

In the fifth example mode 540 (e.g., the no mobile hotspots available mode), information (or data) may be communicated between an end-user device and a server via the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network, and/or the backbone provider network (e.g., skipping the fixed hotspot access network). Also for example, information communicated between an end user device and a server may be communicated via the backbone provider network (e.g., skipping the fixed hotspot access network and/or local infrastructure provider network).

Similarly, in the fifth example mode 540 (e.g., the no mobile hotspots available mode), information (or data) may be communicated between an environment device and a server via the fixed hotspot access network, the local infrastructure provider network, and/or the backbone provider network. Also for example, an environment device may communicate with or through an end-user device (e.g., instead of or in addition to the fixed hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the fixed hotspot access network). Also for example, information communicated between an environment device and a server may be communicated via the backbone provider network (e.g., skipping the fixed hotspot access network and/or local infrastructure provider network). Additionally for example, information communicated between an environment device and a server may be communicated via the local infrastructure provider network (e.g., skipping the fixed hotspot access network and/or the backbone provider network).

In the fifth example mode 540, in an example implementation, the end-user devices and environment devices may communicate directly to Fixed APs (e.g., utilizing Ethernet, Wi-Fi, etc.). Also for example, the end-user devices and/or environment devices may communicate directly with the backbone provider network (e.g., utilizing cellular connections, etc.).

The fifth example mode 540 may be utilized for any of a variety of reasons, non-limiting examples of which are provided herein. In an example implementation in which end-user devices and/or environment devices may communicate directly with Fixed APs, such communication may be utilized instead of Mobile AP communication. For example, the fixed hotspot access network might provide coverage for all desired areas.

Note also that the fifth example mode 540 may be utilized in a scenario in which the fixed hotspot access network is normally available but is currently unavailable (e.g., due to equipment failure, due to communication link failure, due to power outage, due to a temporary denial of service, etc.).

The sixth example mode (or configuration) 550 (e.g., the no fixed/mobile hotspots and local infrastructure available mode) may, for example, share any or all characteristics with the first example mode 500, albeit without the local infrastructure provider network, fixed hotspot access network, mobile hotspot access network, and communication links therewith. For example, the communication system in the sixth example mode 550 comprises a backbone provider network, end-user devices, and environment devices.

As shown in FIG. 5B, and in FIG. 1 in more detail, the backbone provider network may be communicatively coupled to any or all of the other elements present in the sixth example mode 550 (or configuration) via one or more wired (or tethered) links. For example, the backbone provider network may be communicatively coupled to the end-user devices and/or environment devices via one or more wired links. Note that such a wired coupling may be temporary.

Also shown in FIG. 5B, and in FIG. 1 in more detail, the backbone provider network may be communicatively coupled to any or all of the other elements present in the sixth example mode 550 (or configuration) via one or more wireless links (e.g., RF link, non-tethered optical link, etc.). For example, the backbone provider network may be communicatively coupled to the end-user devices and/or environment devices via one or more wireless links.

The end-user devices are also shown in the sixth example mode 550 to be communicatively coupled to the environment devices via one or more wireless links. Many examples of such wireless coupling are provided herein.

In the sixth example mode 550 (e.g., the no fixed/mobile hotspots and local infrastructure available mode), information (or data) may be communicated between an end-user device and a server via the backbone provider network. Similarly, in the sixth example mode 550 (e.g., the no fixed/mobile hotspots and local infrastructure mode), information (or data) may be communicated between an environment device and a server via the backbone provider network. Also for example, an environment device may communicate with or through an end-user device (e.g., instead of or in addition to the mobile hotspot access network).

The sixth example mode 550 may be utilized for any of a variety of reasons, non-limiting examples of which are provided herein. In an example implementation, for example in which an end-user has not yet subscribed to the communication system, the end-user device may subscribe to the system through a Cloud application and by communicating directly with the backbone provider network (e.g., via cellular link, etc.). The sixth example mode 550 may also, for example, be utilized in rural areas in which Mobile AP presence is sparse, Fixed AP installation is difficult or impractical, etc.

Note also that the sixth example mode 550 may be utilized in a scenario in which the infrastructure provider network, fixed hotspot access network, and/or mobile hotspot access network are normally available but are currently unavailable (e.g., due to equipment failure, due to communication link failure, due to power outage, due to a temporary denial of service, etc.).

The seventh example mode (or configuration) 560 (e.g., the no backbone and mobile hotspots available mode) may, for example, share any or all characteristics with the first example mode 500, albeit without the backbone provider network, mobile hotspot access network, and communication links therewith. For example, the communication system in the seventh example mode 560 comprises a local infrastructure provider network, fixed hotspot access network, end-user devices, and environment devices.

As shown in FIG. 5C, and in FIG. 1 in more detail, the local infrastructure provider network may be communicatively coupled to any or all of the other elements present in the seventh example mode 560 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary.

Also, though not explicitly shown, the local infrastructure provider network may be communicatively coupled to any or all of the other elements present in the seventh example mode 560 (or configuration) via one or more wireless links (e.g., RF link, non-tethered optical link, etc.). For example, the local infrastructure provider network may be communicatively coupled to the fixed hotspot access network (or any component thereof), the end-user devices, and/or environment devices via one or more wireless links. Note that the communication link shown in the seventh example mode 560 of FIG. 5C between the local infrastructure provider network and the fixed hotspot access network may be wired and/or wireless.

The fixed hotspot access network is also shown in the seventh example mode 560 to be communicatively coupled to the end-user devices and/or environment devices via one or more wireless links. Many examples of such wireless coupling are provided herein. Additionally, the end-user devices are also shown in the seventh example mode 560 to be communicatively coupled to the environment devices via one or more wireless links. Many examples of such wireless coupling are provided herein.

In the seventh example mode 560 (e.g., the no backbone and mobile hotspots available mode), information (or data) may be communicated between an end-user device and a server via the fixed hotspot access network and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network (e.g., skipping the fixed hotspot access network).

Similarly, in the seventh example mode 560 (e.g., the no backbone and mobile hotspots available mode), information (or data) may be communicated between an environment device and a server via the fixed hotspot access network and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the local infrastructure provider network (e.g., skipping the fixed hotspot access network).

The seventh example mode 560 may be utilized for any of a variety of reasons, non-limiting examples of which are provided herein. In an example controlled space implementation, Cloud access might not be provided (e.g., for security reasons, privacy reasons, etc.), and full (or sufficient) coverage of the coverage area is provided by the fixed hotspot access network, and thus the mobile hotspot access network is not needed. For example, the end-user devices and environment devices may communicate directly (e.g., via Ethernet, Wi-Fi, etc.) with the Fixed APs Note also that the seventh example mode 560 may be utilized in a scenario in which the backbone provider network and/or fixed hotspot access network are normally available but are currently unavailable (e.g., due to equipment failure, due to communication link failure, due to power outage, due to a temporary denial of service, etc.).

The eighth example mode (or configuration) 570 (e.g., the no backbone, fixed hotspots, and local infrastructure available mode) may, for example, share any or all characteristics with the first example mode 500, albeit without the backbone provider network, local infrastructure provider network, fixed hotspot access network, and communication links therewith. For example, the communication system in the eighth example mode 570 comprises a mobile hotspot access network, end-user devices, and environment devices.

As shown in FIG. 5C, and in FIG. 1 in more detail, the mobile hotspot access network is shown in the eighth example mode 570 to be communicatively coupled to the end-user devices and/or environment devices via one or more wireless links. Many examples of such wireless coupling are provided herein. Further, the end-user devices are also shown in the eighth example mode 570 to be communicatively coupled to the environment devices via one or more wireless links. Many examples of such wireless coupling are provided herein.

In the eighth example mode 570 (e.g., the no backbone, fixed hotspots, and local infrastructure available mode), information (or data) might not (at least currently) be communicated between an end-user device and a server (e.g., a coupled to the backbone provider network, local infrastructure provider network, etc.). Similarly, information (or data) might not (at least currently) be communicated between an environment device and a server (e.g., a coupled to the backbone provider network, local infrastructure provider network, etc.). Note that the environment device may communicate with or through an end-user device (e.g., instead of or in addition to the mobile hotspot access network).

The eighth example mode 570 may be utilized for any of a variety of reasons, non-limiting examples of which are provided herein. In an example implementation, the eighth example mode 570 may be utilized for gathering and/or serving data (e.g., in a delay-tolerant networking scenario), providing peer-to-peer communication through the mobile hotspot access network (e.g., between clients of a single Mobile AP, between clients of respective different Mobile APs, etc.), etc. In another example scenario, the eighth example mode 570 may be utilized in a scenario in which vehicle-to-vehicle communications are prioritized above vehicle-to-infrastructure communications. In yet another example scenario, the eighth example mode 570 may be utilized in a scenario in which all infrastructure access is lost (e.g., in tunnels, parking garages, etc.).

Note also that the eighth example mode 570 may be utilized in a scenario in which the backbone provider network, local infrastructure provider network, and/or fixed hotspot access network are normally available but are currently unavailable (e.g., due to equipment failure, due to communication link failure, due to power outage, due to a temporary denial of service, etc.).

As shown and discussed herein, it is beneficial to have a generic platform that allows multi-mode communications of multiple users or machines within different environments, using multiple devices with multiple technologies, connected to multiple moving/static things with multiple technologies, forming wireless (mesh) hotspot networks over different environments, connected to multiple wired/wireless infrastructure/network backbone providers, ultimately connected to the Internet, Cloud or private network infrastructure.

Figure 6:
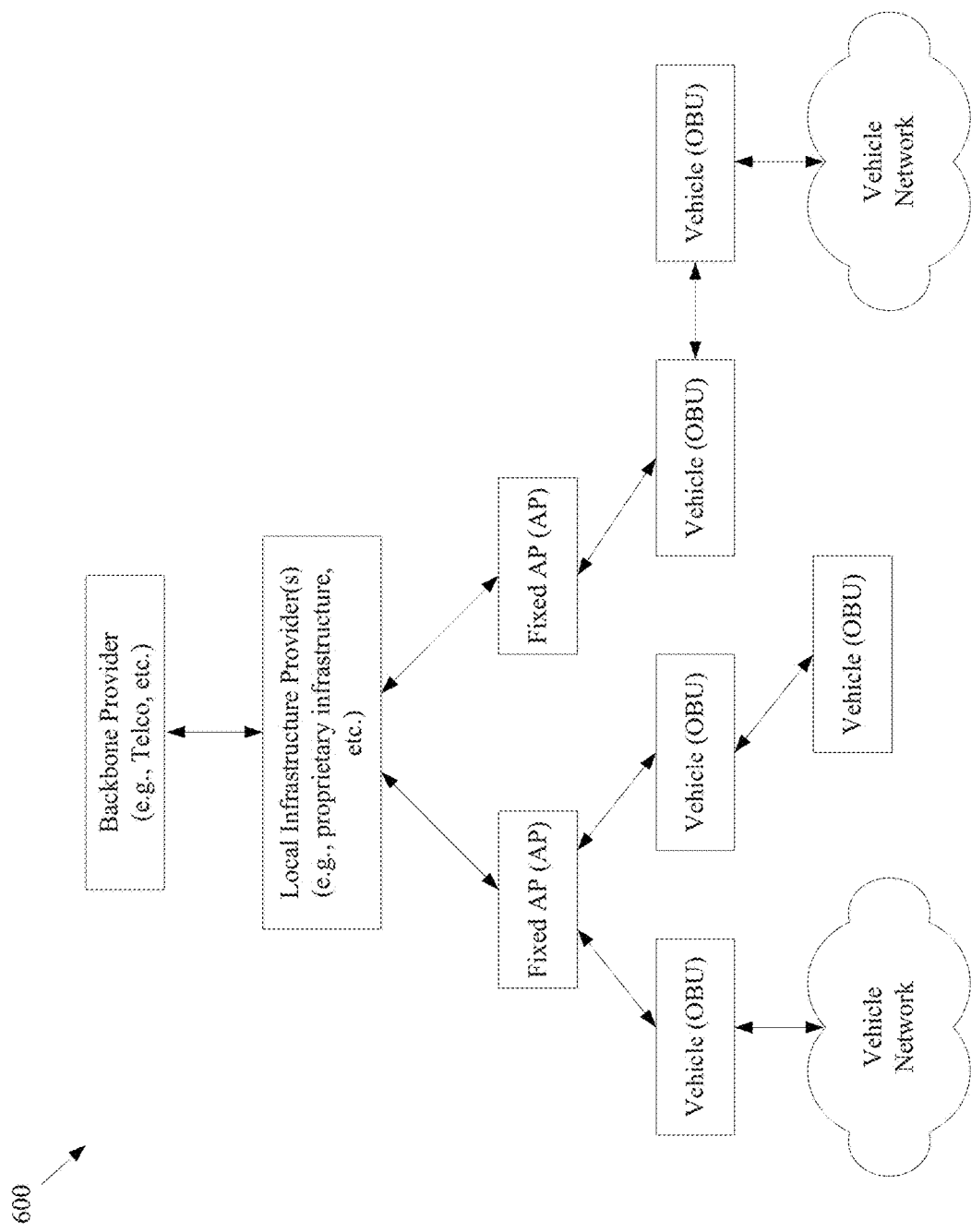
FIG. 6 shows a block diagram of an example communication network, in accordance with various aspects of the present disclosure.

FIG. 6 shows yet another block diagram of an example network configuration, in accordance with various aspects of the present disclosure. The example network 600 may, for example, share any or all characteristics with the other example methods, systems, networks and/or network components 100, 200, 300, 400, 500-570, 700, 800, 900, 1000, and 1100, discussed herein. Notably, the example network 600 shows a plurality of Mobile APs (or OBUs), each communicatively coupled to a Fixed AP (or RSU), where each Mobile AP may provide network access to a vehicle network (e.g., comprising other vehicles or vehicle networks, user devices, sensor devices, etc.).

In accordance with various aspects of the present disclosure, systems and methods are provided that manage a vehicle communication network, for example in accordance with the location of nodes and end devices, in a way that provides for stable TCP/IP Internet access, among other things. For example, an end user may be provided with a clean and stable Wi-Fi Internet connection that may appear to the end user to be the same as the Wi-Fi Internet connection at the user's home, user's workplace, fixed public Wi-Fi hotspots, etc. For example, for a user utilizing a communication network as described herein, a TCP session may stay active, downloads may process normally, calls may proceed without interruption, etc. As discussed herein, a vehicle communication network in accordance with various aspects of this disclosure may be applied as a transport layer for regular Internet traffic and/or for private network traffic (e.g., extending the access of customer private LANs from the wired network to vehicles and users around them, etc.).

In accordance with an example network implementation, although a user might be always connected to a single Wi-Fi AP of a vehicle, the vehicle (or the access point thereof, for example an OBU) is moving between multiple access points (e.g., Fixed APs, other Mobile APs, cellular base stations, fixed Wi-Fi hotspots, etc.). For example, mobility management implemented in accordance with various aspects of the present disclosure supports the mobility of each vehicle and its users across different communication technologies (e.g., 802.11p, cellular, Wi-Fi, etc.) as the Mobile APs migrate among Fixed APs (and/or Mobile APs, Wi-Fi Hotspots, cellular base stations, etc.) and/or as users migrate between Mobile APs (and/or Fixed APs, Wi-Fi Hotspots, cellular base stations, etc.).

In accordance with various aspects of the present disclosure, a mobility controller (MC), which may also be referred to as an LMA or Network Controller, may monitor the location (e.g., network location, etc.) of various nodes (e.g., Mobile APs, etc.) and/or the location of end users connected through them. The mobility controller (MC) may, for example, provide seamless handovers (e.g., maintaining communication session continuity) between different access points and/or different technologies with low link latency and low handover times.

The architecture provided herein is scalable, for example taking advantage of redundant elements and/or functionality to provide load-balancing of control and/or data communication functionality, as well as to decrease failure probability. Various aspects of the present disclosure also provide for decreased control signaling (e.g., in amount and/or frequency), which reduces the control overhead and reduces the size of control tables and tunneling, for example both in backend servers and in APs (e.g., Fixed APs and/or Mobile APs).

Additionally, a communication network (or components thereof) in accordance with various aspects of this disclosure may comprise the ability to interact with mobile devices in order to control some or all of their connection choices and/or to leverage their control functionality. For example, in an example implementation, a mobile application can run in the background, managing the available networks and/or nodes thereof and selecting the one that best fits, and then triggering a handoff to the selected network (or node thereof) before breakdown of the current connection.

The communication network (or components thereof) is also configurable, according to the infrastructure requirements and/or mobility needs of each client, etc. For example, the communication network (or components thereof) may comprise the capability to support different Layer 2 (L2) or Layer 3 (L3) implementations, or combinations thereof, as well as IPv4/IPv6 traffic.

At various times during operation of the vehicle network as presented herein, the resources of the vehicle network may be unutilized or underutilized. For example, the resources of the vehicle network may be selected such that acceptable performance is provided in a worst case scenario. An unfortunate side affect of such network design is that resources are purchased and maintained but are often underutilized. An opportunity thus exists to recuperate at least a portion of the investment by providing a system and method that provides for the utilization of such underutilized resources. Such resources may, for example, comprise stationary and/or moving processing resources, memory resources, general data gathering/storing/processing resources, sensor data gathering/storing/processing resources, communication resources, energy resources, etc. Various aspects of this disclosure leverage the excess capacity (e.g., computational or processing capacity, data acquisition and/or processing capacity, memory capacity, energy capacity, etc.) to offer (or provide) the vehicular network as a service to developers and systems that want to run their applications and services in a distributed fashion. For example, the systems and methods discussed herein may also provide for the reduction of communication network traffic by offloading the computation from the Cloud to the edge of the network, where for example the data is available at a lower cost and lower latency, and where multiple processors (e.g., mobile processors, access point processors, etc.) may acquire and/or process the data in parallel. Additionally, the flexibility and power of a vehicle communication system implemented in accordance with various aspects of the present disclosure may result in relatively large amounts of data (e.g., client data, sensor data, vehicle data, etc.) communicated through communication links with finite bandwidth, resulting in network congestion, latency, unavailability, etc. A system and/or method implemented in accordance with various aspects of the present disclosure may address at least a portion of such bandwidth-related issues. For example, at least a portion of the application processing may be pushed down to the edge nodes (e.g., Mobile APs, Fixed APs, etc.), where such processing may, for example, analyze and/or summarize collected data or other information (e.g., summarizing measurement results, providing data analysis results with less or no raw data, performing various types of compression or filtering, etc.). The results of such analysis and/or summarizing and/or processing may be communicated through the network instead of the relatively larger amount of raw data.

It should be noted that although various systems and methods may exist for the time-sharing of various computational and/or memory resources, such systems and methods fail in the context of the vehicle communication network. As a non-limiting example, due to the mobile nature of various resources and/or data sources, and/or the requirement to provide services to mobile infrastructure and/or client nodes, traditional ways of utilizing underutilized resources are inadequate, for example failing to consider the effects that mobility has on an available resource. For example, based at least in part on mobility of a resource, the resource may only be available (or may only be available for a particular desired purpose) for a particular time window, outside of which an alternate resource may be available for utilization. For example, a particular mobile access point may be within wireless communication range of a particular stationary sensor as a data source during a particular time window, outside of which the particular mobile access point might not have communicative access to the particular stationary sensor. Also for example, as a particular mobile access point enters and exits particular geographical regions with particular respective amounts of utilization of the mobile access point's network access services (e.g., mobile Internet access, etc.), the availability of various resources of the particular mobile access point will change. In other words, a resource of a mobile access point that is underutilized at a first location may be maximally utilized a few moments later, and return to an underutilized status a few moments later. Traditional methods of resource allocation and utilization are unable to perform adequately in such circumstances.

Also, systems and methods implemented in accordance with various aspects of the present disclosure may, for example, provide (or define) a development environment that defines how developers interact (e.g., with the system, with each other, etc.) and develop applications to be distributed (e.g., adaptively distributed, etc.) in the Mobile Computation Nodes (MCNs) in the Internet of Moving Things (IMT) using the Vehicle Network As A Service (VNAAS).

Also, systems and methods implemented in accordance with various aspects of the present disclosure may, for example, provide for the testing and validation of applications before such applications are distributed to the MCNs. Though such testing and validation may, for example, be implemented during the development of applications (e.g., to provide early warning for developers or system administrators, etc.), final testing and validation may also be performed to ensure the operational integrity of the system (e.g., of the vehicle communication system, infrastructure, Cloud servers, etc.).

Further, systems and methods implemented in accordance with various aspects of the present disclosure may, for example, define fundamental structures (e.g., objects, methods, procedures, functions, executing hierarchy, standard APIs available for utilization, data structures, messages, etc.) for the applications to be distributed and used in a VNAAS scenario. Such fundamental structures may, for example, be provided to the developers in the development environment (e.g., in an Integrated Development Environment (IDE), Computer Assisted Software Engineering (CASE) tools, etc.) to assist the developers in developing applications that are compatible with the system.

Additionally, systems and methods implemented in accordance with various aspects of the present disclosure may, for example, determine (or define) how multiple applications (e.g., related or unrelated applications) will be scheduled and distributed in the MCNs, for example utilizing a Cloud-based VNAAS Gatekeeper (CVG). For example, such scheduling (or mapping) may include determining how the CVG will map the application requirements with the local resources to be utilized in the MCNs.

Further, systems and methods implemented in accordance with various aspects of the present disclosure may, for example, assess the existing (and/or anticipated) excess and underutilized capacity in the MCNs. Such assessment may, for example, be performed continually, periodically, etc. The results of such assessment may, for example, be utilized in the scheduling and distribution of applications, in billing for resource utilization, etc.

Still further, systems and methods implemented in accordance with various aspects of the present disclosure may, for example, measure the execution of the applications and/or the resources utilized by the applications executing on the MCNs. For example, the CVG may collect data and logging produced by the several applications running on the MCNs. The results of such measuring may, for example, be utilized for billing and accounting purposes, as feedback for the adaptation of the manner in which applications are scheduled on the MCNs, etc.

Various aspects of the present disclosure will now be presented by referring to example drawings of system and network components and methods, of application life cycle diagrams, etc.

Figure 7:
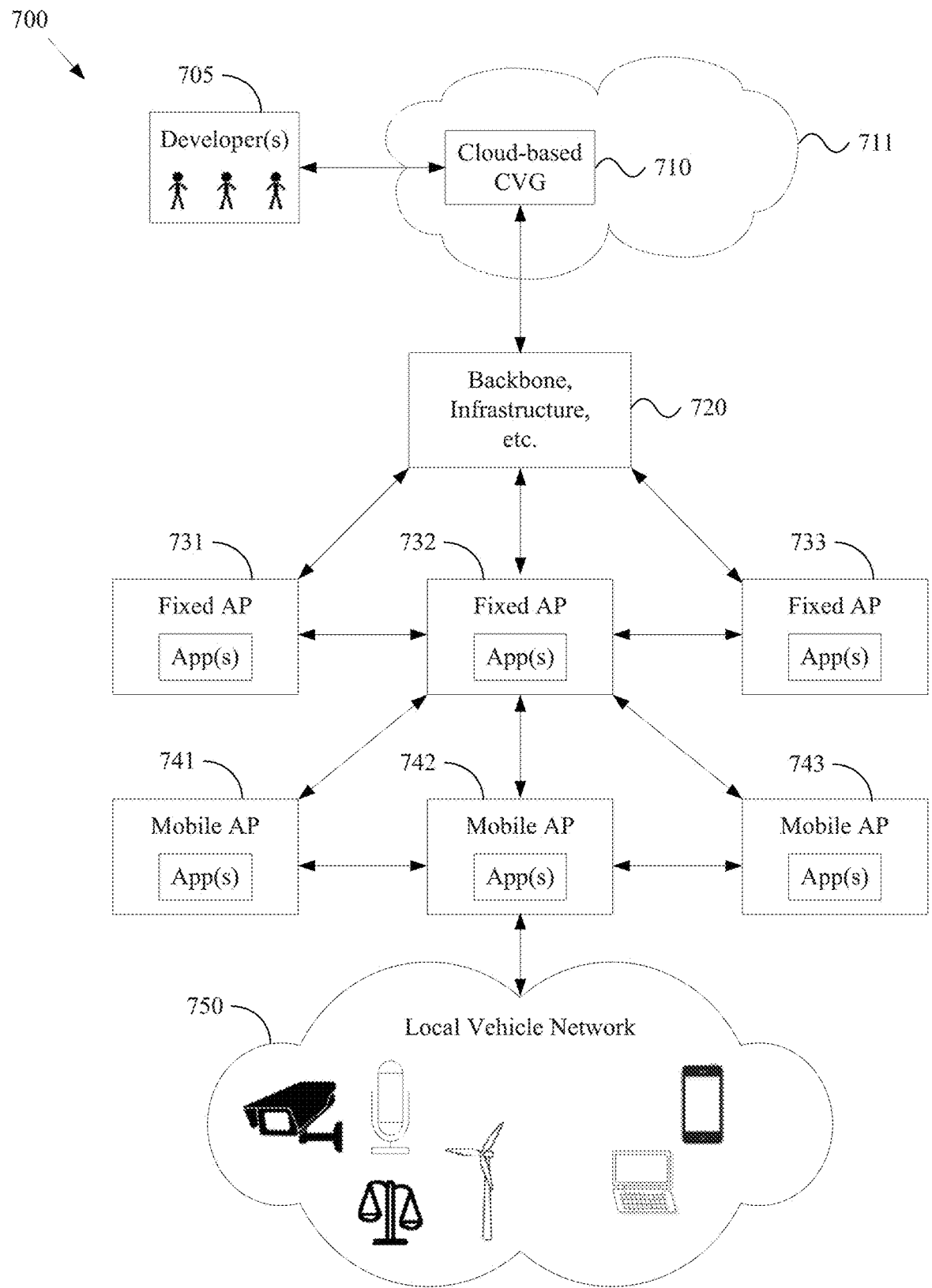
FIG. 7 shows a block diagram of an example communication network, in accordance with various aspects of the present disclosure.

Turning to FIG. 7, such figure shows a block diagram of an example communication network, in accordance with various aspects of the present disclosure. The example communication network 700 (or system) or components thereof may share any or all characteristics with the other example methods, systems, networks and/or network components 100, 200, 300, 400, 500-570, 600, 800, 900, 1000, 1000, and 1100, discussed herein.

One or more developers 705 may, for example, develop (e.g., design, code, test, etc.) an application in a familiar development environment, which may for example be provided by a CVG 710 based in the Cloud 711 (e.g., the Internet, etc.). Note that the CVG 710 may be also implemented on a proprietary system, access to which may be tightly regulated. The CVG 710 may, for example, provide a development interface by which a developer 705 may define data, networking, and resource requirements, etc. (e.g., of one or more MCNs, general vehicle networking environment, any of the vehicle network nodes discussed herein, etc.) that would be executed in a number of MCNs (e.g., MAPs, FAPs, vehicles, etc.) that are part of the vehicle network. Such execution may, for example, utilize excess resources (e.g., resources that are not utilized, underutilized, etc.) of the nodes of the vehicle network. As discussed herein, such resources may comprise processor (or computation) resources, memory resources, communication resources, data access resources, sensor resources, etc. For example, an excess resource may include a communication link (e.g., a channel, a portion of a channel, etc.) that will be available during a particular time window between a MAP and a sensor, and another excess resource may include a processor of the MAP that may analyze the data from the sensor and develop a summary of the analyzed data, and a further excess resource may include a communication circuit of the MAP that may communicate the summary to a cloud server via the vehicle communication network, and a still further excess resource may be memory space that may be available at least temporarily to carry data until such data can be offloaded.

In the example network 700, the CVG 710 may be communicatively coupled to Fixed APs 731, 732, and 733, Mobile APs 741, 742, and 743, network components 750 of a vehicle (e.g., cameras, microphones, scales, weather sensors, user smart phones, user computers, autonomous vehicle control system components, on-board diagnostic components, etc.), etc., through a backbone infrastructure, Network Controllers (NCs) of the vehicle network, etc. As discussed herein, an MCN may include a Fixed AP, a Mobile AP, another device (e.g., a sensor device, a client computing device, etc.) communicatively coupled to a Fixed AP and/or Mobile AP, etc., of the vehicle network. As shown in FIG. 7, the CVG 710 may map applications to the MCNs (e.g., Fixed APs 731, 732, and 733; Mobile APs 741, 742, and 743; network components 750; etc.) and otherwise schedule and control their execution. Also, as shown in FIG. 7, the various Fixed APs 731, 732, and 733 and Mobile APs 741, 742, and 743 may communicate with each other, providing communication pathways for the applications to communicate with each other.

For example, in an example scenario, the CVG 710 may map applications (or portions thereof) to an access point or other MCN based, at least in part, on location of the access point or other MCN. For example, a particular MCN (or group thereof) may be located (or anticipated to be located) within communication range of a sensor at a particular location, a particular MCN (or group thereof) may be located (or anticipated to be located) within communication range of a particular intersection, a particular MCN (or group thereof) may be located on a particular street, a particular MCN (or group thereof) may be within communication range (or anticipated to be within communication range) of a particular venue, etc. Note that the location of the MCN (and/or a resource communicatively coupled to the MCN) may change over time. For example, the MCN may have a trajectory, and such trajectory may impact the ability of the MCN to perform a desired function for an application. In an example scenario involving an application that collects and processes data from a particular sensor in the field at a particular location, the CVG may map the application to a first set of one or more MCNs (e.g., stationary and/or mobile MCNs) that are anticipated to be near the particular location during a first time window, and map the application to a second set of one or more MCNs (e.g., stationary and/or mobile MCNs) that are anticipated to be near the particular location during a second time window, etc. Note that the application mapping may then, for example, be adjusted based on real-time location information, for example to accommodate circumstances where one or more MCNs are not where they were anticipated to be, or otherwise are unable to perform the mapped operations.

Figure 8:
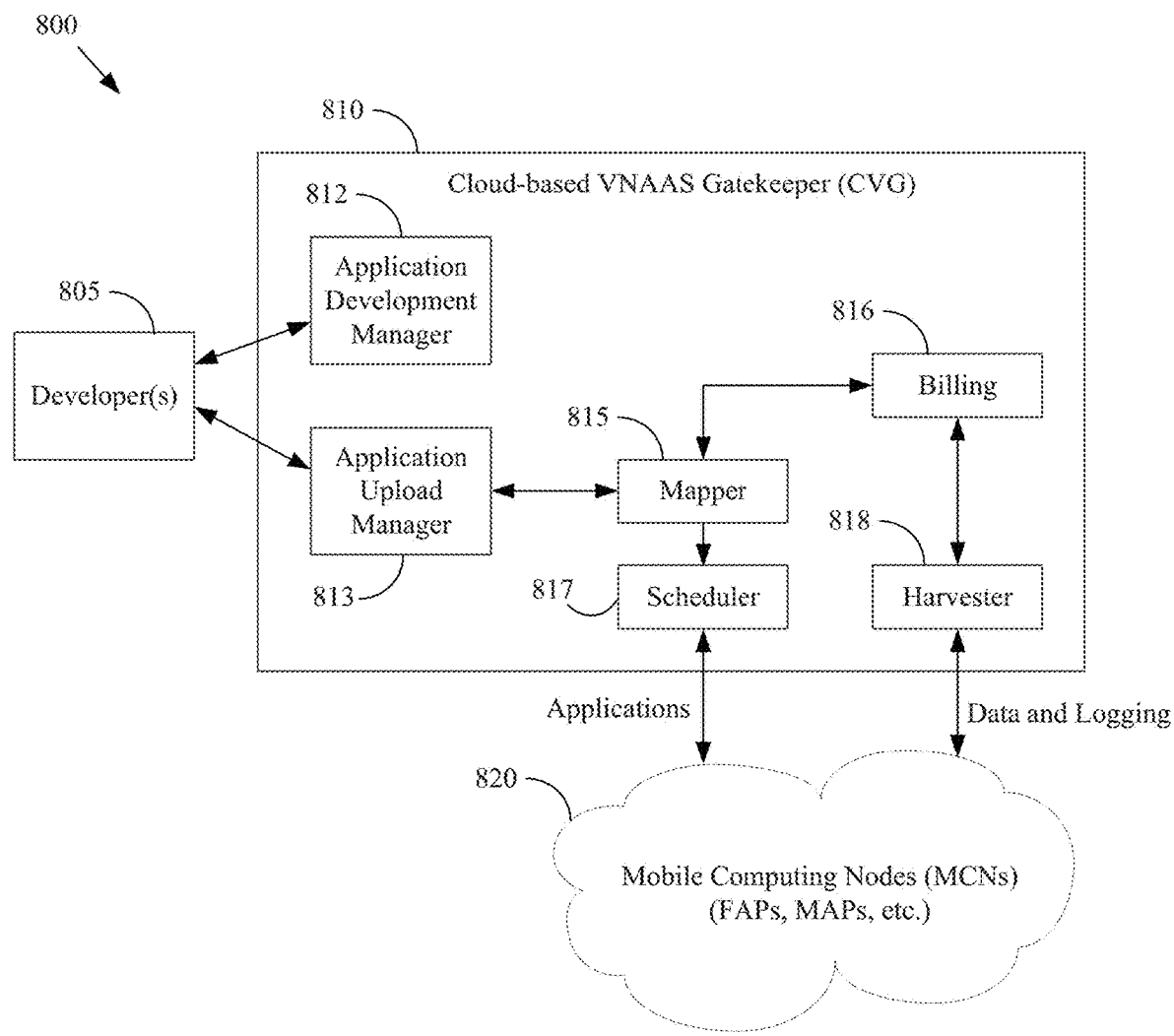
FIG. 8 shows a block diagram of an example Cloud-based Vehicle-network-as-a-service (VNAAS) Gatekeeper and network, in accordance with various aspects of the present disclosure.

Turning next to FIG. 8, such figure shows a block diagram of an example Cloud-based Vehicle-Network-As-A-Service (VNAAS) Gatekeeper (or CVG) and network, in accordance with various aspects of the present disclosure. The example communication network 800 (or system) or components thereof may share any or all characteristics with the other example methods, systems, networks and/or network components 100, 200, 300, 400, 500-570, 600, 700, 900, 1000, and 1100, discussed herein.

The Cloud-based VNAAS Gatekeeper (CVG) 810 may, for example, generally operate as the main coordinator for the developing, distributing, and globally controlling execution of applications, etc. For example, the CVG 810 may provide an environment for developers 805 to develop applications and to upload developed applications to the system. The CVG 810 may also, for example, manage the mapping of the applications to available resources (e.g., underutilized MCN resources, etc.) of the vehicle network. The CVG 810 may also, for example, manage and perform the distribution of applications to the MCNs 820. Also for example, the CVG 810 may control or manage the execution of the applications at the MCNs 820. Additionally, for example, the CVG 810 may monitor the execution of the applications at the MCNs 820, for example for billing purposes, to identify and handle applications that are not performing in an allowed manner or otherwise harming the system, to utilize as feedback to the selected mapping, etc.

The example CVG 810 of FIG. 8 may, for example, include various functional modules (e.g., software or firmware code implemented by one or more processors thereof, etc.) that operate to perform the various CVG functionalities discussed herein.

For example, the example CVG 810 may include an Application Development Manager (ADM) 812, or ADM module, that operates to provide the application development environment discussed herein, for example, providing Computer Assisted Software Engineering (CASE) tools and/ or an Integrated Development Environment (IDE) to developers, for example, providing pre-defined, tested, and approved application structures (e.g., objects, attributes, methods, functions, procedures, data structures, data definitions, message structures, etc.) for the efficient development of applications that meet the design criteria set forth for the vehicle network.

Also for example, the example CVG 810 may include an Application Upload Manager (AUM) 813, or AUM Module, that operates to receive applications from developers 805. The AUM 813 may, for example, perform any number of checks and validations on the received applications to ensure that the uploaded applications match the specifications of the system, match the programming language(s) and/or operating systems in use, etc. Note that, as discussed herein, the ADM 813 may provide one or more CASE tools, with pre-developed and pre-approved fundamental structures (or building blocks) that may be used by developers 805 during development to avoid various validation issues that may be flagged by the AUM 813 during the validation process.

In an example implementation, the CVG 810 may provide a robust emulation (or simulation) environment (e.g., emulating the operation of any or all of the nodes of the vehicle communication network, emulating expected operating environments, etc.) in which developers 805 may interface their application code with emulated (or simulated) vehicle network nodes (e.g., potential MCNs), for example utilizing the exact interfaces with which the application code would interface with real-world vehicle network nodes. In an example implementation, the CVG 810 may also utilize various simulated scenarios in a test suite as part of the validation procedure.

Additionally for example, the CVG 810 may include a Mapper 815 that operates to receive the validated application code from the AUM 813, and extract (or segment or separate or identify) the code that will be distributed and executed in one or more of the MCNs 820 and the code that will be executed in the CVG 810 (or other centralized node, for example a network controller, etc.) during and/or after the execution of the application (or portions thereof) at the MCN(s). For example, application code may include a central (or master) application, which may for example be run at a cloud server or network controller or other device(s), that interfaces with (e.g., controls, directs, requests/receives data from, etc.) child (or slave) applications, which may for example be executed at or near the vehicle communication network edge nodes (e.g., Mobile APs, Fixed APs, etc.). The Mapper 815 may also, for example, allocate (or communicate) the global and specific rules to distribute computation in the several MCNs 820.

Note that an application (or portion thereof) need not be developed to run only on a particular network node (e.g., on a CVG 810, on an MCN 820, etc.). For example, in an example implementation, an application (or portion thereof) may be developed that may adaptively be executed at the Cloud server level (e.g., at the CVG 810 or other server) or at the MCN 820 level. In such an implementation, the Mapper 815 may flexibly determine (e.g., based on amount of network traffic, based on profile parameters of the application developer, based on cost, etc.) whether to map the application (or portion thereof) to one or more MCNs 820 or whether to execute the application (or portion thereof) at the Cloud level, for example at a CVG 810.

For example, the Mapper 815 may operate to map the MCN portions of the application(s) to underutilized resources of one or more MCNs 820. In an example scenario, the Mapper 820 may identify a subset of the available MCNs for executing an application, for example, mapping an application to a set of MCNs (e.g., to a set of MCNs having the most respective underutilized resources, to a set of MCNs located in and/or anticipated to be located in a particular area and having underutilized resources, etc.) until a resource utilization goal is met. For example, the Mapper 815 may identify a target amount of data acquisition and/or processing desired (e.g., minimum target, optimal target, etc.) for an application, and allocate enough MCNs 820 (or underutilized resources thereof) to meet the target amount.

Note that the Mapper 815 may adjust the allocation of resources during execution of the applications by the MCNs 820, for example due to changing amount of underutilized resources in the MCNs 820, etc. For example, in an example scenario in which an Mobile AP acting as an MCN enters an area that demands the utilization of most or all of the Mobile AP's resources to fulfill its primary purpose as a mobile communication node, the Mapper 815 may identify this situation and move application processing from the Mobile AP to another Mobile AP that presently has underutilized resources. The Mapper 815 may, for example, receive information from the Mobile AP (or a central network controller, etc.) indicating that the Mobile AP's resources are (or are anticipated to be) mostly utilized for functionality of primary importance to the Mobile AP (e.g., functionality directly associated with operation of the vehicle communication network, emergency functionality, safety functionality, etc.). The MCN 820, in this scenario, may periodically send resource utilization status messages (e.g., including information identifying current respective resource utilization for one or more resources thereof, anticipated respective resource utilization for one or more resources thereof, etc.) to the CVG 810, may send such status messages triggered by one or more resource utilization thresholds, may send such status messages to the CVG 810 synchronously upon request from the CVG 810, may send such status messages asynchronously, etc. For example, an MCN 820 may message the CVG 810 upon determining that a previously allocated resource is now (or anticipated to be) over-utilized. The MCN 820 may, for example, make such a determination based on present operating conditions and/or on historical utilization (e.g., as a function of location, time, day, etc.).

Note that the Mapper 815 may map applications to MCNs 820 based on any of a variety of considerations. For example, the Mapper 815 may develop a distribution function (e.g., a function of time, etc.) that governs the distribution of one or more applications to the MCNs 810 and/or the execution of the one or more distributed applications. For example, the Mapper 815 may map applications to MCNs 820 based on percentage of available or underutilized resources of the MCNs 820 (e.g., current and/or anticipated percentage), based on geographical location (and/or velocity) of the MCNs 820, based on energy-remaining levels of the MCNs 820, based on current and/or predicted direction of travel of the MCNs 820 (e.g., heading toward or away from busy areas, etc.), based on fleet identity, based on time-of-day, based on type-of-day, based on day-of week, based on historical resource utilization, etc. Any or all of such information may be provided by the MCNs 820 in real-time, may be provided by a central vehicle network controller, a combination thereof, etc.). For example, in an example scenario, the Mapper 815 may calculate (e.g., based on actual and/or anticipated MCN 820 location and/or trajectory information) an expected amount of time that an MCN 820 may be within communication range of a sensor of interest, and base the mapping (or distribution) of application execution to the MCN 820 based at least in part on the expected amount of time. Also for example, in an example scenario, the Mapper 815 may (e.g., based on current time (e.g., time-of-day, day-of-week, etc.) and historical resource utilization for an MCN 820 in a particular geographical area) anticipate that the MCN 820 is about to have a relatively high amount of available resources or a particular resource of interest, and schedule an application for the MCN 820 during a time period that coincides with a window of anticipated high availability. Additionally, for example, in an example scenario in which the application was defined to obtain information from a source over a time period that for various reasons (e.g., location and/or trajectory reasons, resource availability reasons, etc.) is not serviceable by a particular MCN 820 or group thereof, the Mapper 815 may sequentially map the application for execution by different sets of one of more MCNs 820 throughout the time period. For example, the Mapper 815 may, during a first portion of an overall requested time period, map a sensor data acquisition and/or analysis application to a first set of one or more MCNs 820 that are anticipated to be in a geographical area during the first portion of the time period, and during a second portion of the overall requested time period, map the sensor data acquisition application to a second set of one or more MCNs 820 that are anticipated to be in the geographical area during the second portion of the time period. Note that the first and second sets may comprise at least partial overlapping membership, but need not. Note also, that either of the first and second sets may comprise mobile and/or stationary resources.

The example CVG 810 also comprises a Billing Module 816 that operates to calculate, track, and measure the execution credits calculated based on a configurable cost-function. The Billing Module 816 may, for example, received data and logging information, processing time information, communication bandwidth information, memory utilization memory, etc. from the MCNs 820. The Billing Module 816 may then, for example, execute a cost function to process such information to identify a monetary cost (or other cost indicator) associated with an application. For example, the Billing Module 816 may accumulate respective costs for execution of an application from each of a plurality of MCNs 820 to identify a total cost. Note that such a cost function may be adaptable, for example based on customer priority, based on resource availability, based on time-of-day, based on day-of-week, etc.

The example CVG 810 additionally comprises a Scheduler 817 (or Scheduler Module) that operates to distribute the applications to the several MCNs 820 based on the distribution function provided by the Mapper 815. The Scheduler 817 may, for example, open and/or maintain the communication links between the CVG 810 and the MCNs 820 to implement application downloading, to implement application execution control, etc.

The example CVG 810 further comprises a Harvester 818 (or Harvester Module) that operates to collect information (or data) sent by the MCNs 820. Such information (or data) may, for example, comprise application-specific data (e.g., collected sensor data, results of data processing, login information, information indicating an amount of resource utilization, etc.), billing logging information, feedback information related to the performance of the present mapping, etc. Note that the Harvester 818 may passively collect the information (or data) sent by the MCNs 820 (e.g., in an asynchronous manner) and/or may actively solicit (or request) the information (or data) (e.g., in a synchronous manner), for example periodically, when a need for mapping or remapping an application arises, when a fault condition or potential fault condition is detected, etc.

Figure 9:
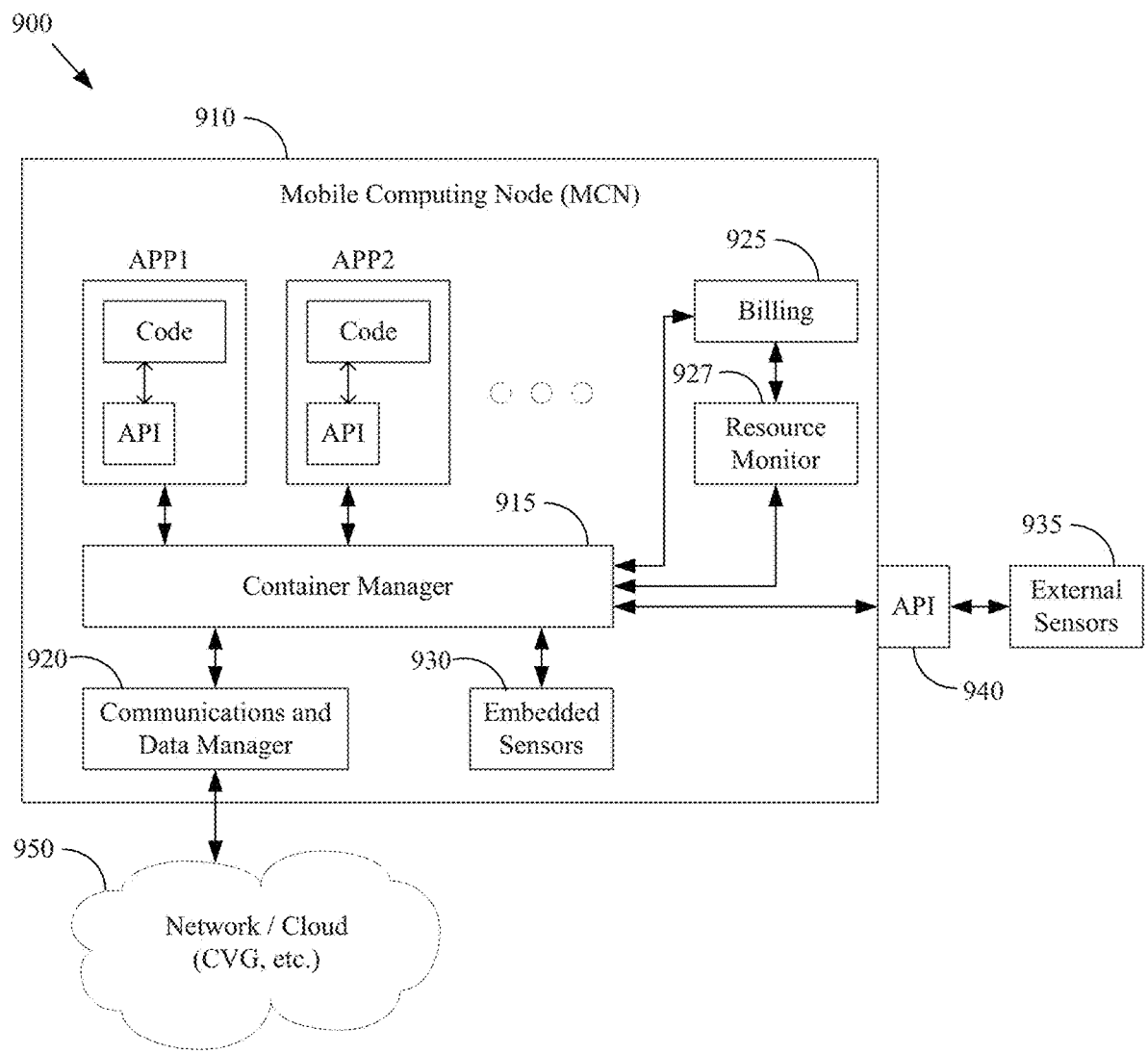
FIG. 9 shows a block diagram of an example Mobile Computing Node (MCN) and network, in accordance with various aspects of the present disclosure.

Turning next to FIG. 9, such figure shows a block diagram of an example Mobile Computing Node (MCN) and network, in accordance with various aspects of the present disclosure. The example communication network 900 (or system) or components thereof may share any or all characteristics with the other example methods, systems, networks and/or network components 100, 200, 300, 400, 500-570, 600, 700, 800, 1000, and 1100, discussed herein.

A Mobile Computing Node (MCN) 910 may, for example, be any of a variety of elements of nodes of a vehicle network or an Internet of Moving Things (IMT) implementation. For example, an MCN 910 may comprise a Mobile AP (or MAP), a Fixed AP (or FAP), a Network Controller (or NC), a portion of a network local to a vehicle (e.g., an autonomous vehicle control system, on-board diagnostic (OBD) system, etc.), etc. The MCN 910 may, for example, share any or all characteristics with any communication network node (or portion thereof) discussed herein.

In accordance with various aspects of the present disclosure, an MCN 910 may for example comprise resources (e.g., processing resources, memory resources, communication resources, sensor and/or sensor access resources, energy resources, mobility resources, vehicle system resources, etc.) that are unutilized or underutilized. As discussed herein, such resources may be utilized to host applications, which may in-whole or in-part be distributed throughout a vehicle communication network or IMT (e.g., to one or more of the various nodes of the vehicle communication network or IMT, etc.).

The MCN 910 may, for example, recognize that its resources are underutilized and/or a central controller (or CVG) may (e.g., through monitoring information flowing from and/or to the MCN 910, etc.) recognize that the MCN 910 has one or more resources that are underutilized. The MCN 910 may, for example, offer the utilization of any one or more of its resources to the CVG (e.g., by sending a message to the CVG through the vehicle communication network or any other communication network path discussed herein, etc.) and/or the CVG may request (or demand) the utilization of any one or more resources of the MCN 910 (e.g., by sending a message to the MCN 910 through the vehicle communication network or any other communication network path discussed herein).

In an example implementation, in addition to availability of various resources (e.g., processing resources, memory resources, etc.) the MCN 910 may have access to data available only locally to the MCN 910 in the context of application execution at the MCN 910, thus providing valuable low-latency access to various data sources (e.g., sensors on-board a vehicle, sensors in general proximity of a vehicle's current location, information directly from an autonomous vehicle control system, etc.).

The example MCN 910 of FIG. 9 may, for example, include various functional modules (e.g., software or firmware code implemented by one or more processors thereof, etc.) that operate to perform the various MCN 910 functionalities discussed herein.

For example, the MCN 910 may, for example, comprise a Container Manager 915 (or Container Manager Module) that operates to manage the execution of the application code received from the CVG. An example of such a Container Manager 915 and/or the operation thereof is presented U.S. patent application Ser. No. 15/616,337, filed Jun. 7, 2017, and titled "SYSTEMS AND METHODS FOR MANAGING CONTAINERS IN A NETWORK OF MOVING THINGS," the entirety of which is hereby incorporated herein by reference for all purposes. The Container Manager 915 may, for example, utilize the Communications and Data Manager Module 920 to communicate with the CVG, other nodes of the Cloud, other nodes of the vehicle communication network, etc.

The MCN 910 may, for example, comprise a local Billing Module 925 that operates to collect and measure the executed credits (or cost or other measure) based on the system usage and data consumption, for example as may be monitored by the Resource Monitor Module 927. The local Billing Module 925 of the MCN 910 may also, for example, operate to BlockChain the collected billing logs.

The MCN 910 may, for example, comprise Embedded Sensors 930 in the hardware that hosts the MCN 910 system (e.g., embedded in the Mobile AP system, embedded in the Fixed AP system, etc.). Thus, the MCN 910 (or any module thereof) may have direct access to data associated with such sensors.

The MCN 910 may also, for example, have communication links (e.g., direct or indirect communication links, any of the types of communication links discussed herein, etc.) with External Sensors 935, for example sensors outside of the MCN 910 hardware. The MCN 910 (or application being executed on the MCN 910) may, for example, pull data from such External Sensors 935 and/or such External sensors 935 may push data to the MCN 910, depending on the implementation. The MCN 910 and/or the External Sensors 935 may comprise an API 940 (or other interface) that provides the interface for such communication of sensor information.

The MCN 910 may additionally, for example, comprise a smart Communications and Data Manager 920 (or Communications and Data Manager Module) that collects and distributes data to the Cloud 950 (e.g., to the CVG, to any of a variety of Cloud servers, etc.). The Communications and Data Manager 920 may, for example, utilize any or all of the manners of communication discussed herein. For example, the Communications and Data Manager 920 may operate to implement immediate real-time communication, delay tolerant communication, communication via the vehicle communication network, communication via the cellular infrastructure, etc. The manner in which the Communications and Data Manager 920 communicates may, for example, be indicated by the corresponding application being executed at the MCN 910 and/or may be determined based on the identity of the corresponding application being executed at the MCN 910, etc.

Various aspects of the disclosure will now be demonstrated in the context of an application life cycle.

Figure 10:
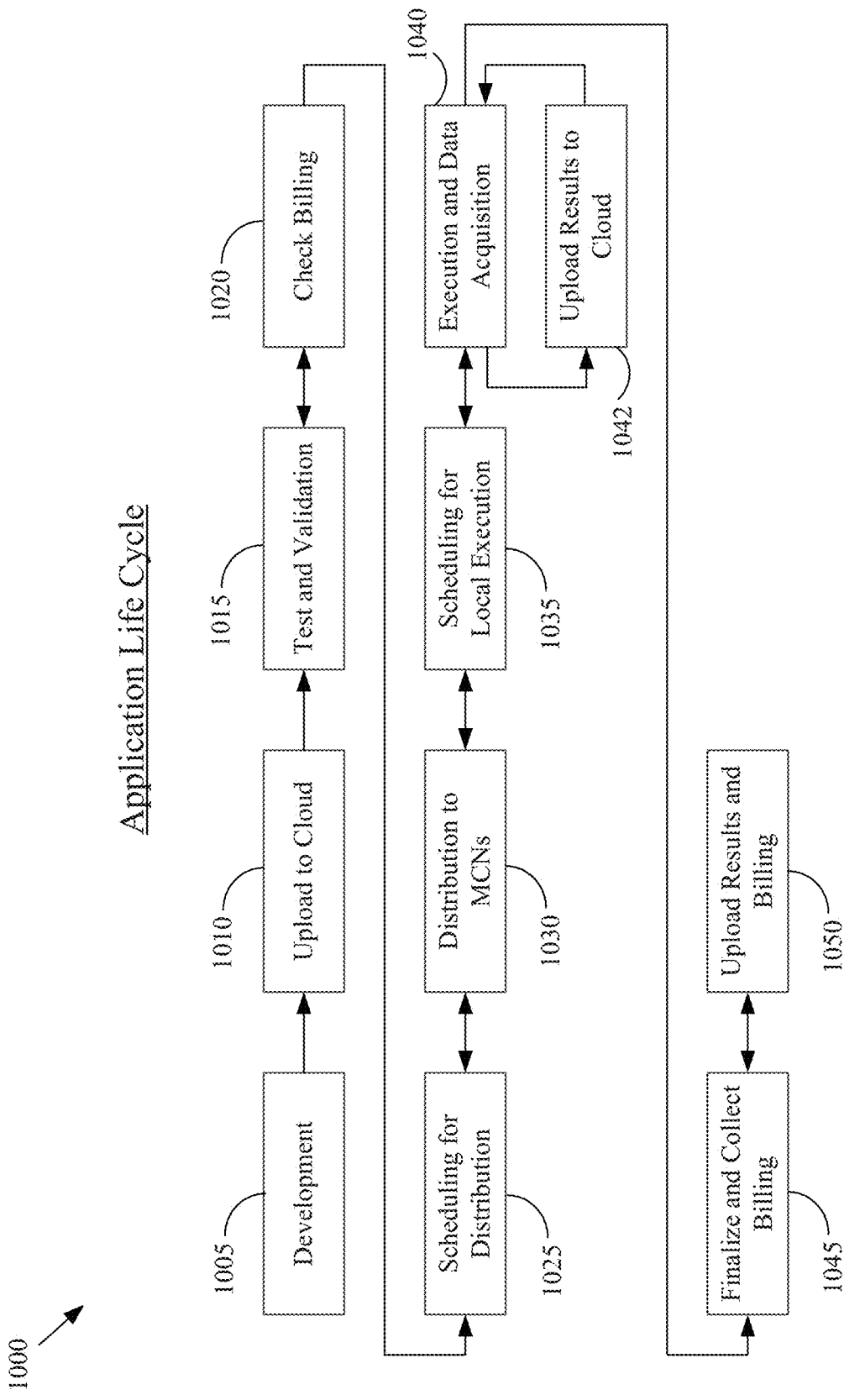
FIG. 10 shows a flow diagram of an application life cycle, in accordance with various aspects of the present disclosure.

Turning next to FIG. 10, such Figure shows a flow diagram 1000 of an application life cycle, in accordance with various aspects of the present disclosure. The example life cycle 1000 (or flow or method or sequence) may, for example, share any or all characteristics with the other example methods, systems, networks and/or network components 100, 200, 300, 400, 500-570, 600, 700, 800, 900, and 1100, discussed herein.

Developers may, for example at block 1005, develop an application using a well-defined structure (e.g., provided by the CVG) that can be enforced by the use of an Integrated Development Environment (IDE) and/or Graphical User Interface (GUI). The application definition may, for example, define (or specify) the types of local data to which the application subscribes. The application definition may also, for example, define (or specify) the local operations that are to be performed by the MCN (and/or the CVG or other node) on data that is obtained locally. The application definition may additionally, for example, define (or specify) the types of global data to which the application subscribes (e.g., combination of locally acquired data, data from other data sources that are available in the Cloud/Internet, data from other MCNs, data fusion, etc.). The application definition may further, for example, define (or specify) the global operations that are to be performed by the MCN (and/or the CVG or other node) on the global and/or local data.

The developed application may, for example at block 1010, be uploaded to the Application Upload Manager (AUM) of the CVG. As discussed herein, the AUM may then, for example at block 1015, perform a set of tests to validate the format and other aspects of the application, and map the requirements of the uploaded application.

When the application is uploaded, the developer may for example define various requirements and characteristics of the application. For example, the developer may specify computation capability that is necessary (or desired), execution priority for the application (e.g., relative to other applications and/or responsibilities of the MCN, etc.), scheduling and duration of execution of the application, identification of the applications (or portions thereof) that may be executed in an MCN, etc.

The CVG may, for example at block 1020, analyze the billing to check the required resources against the available credits that the developer has in the system.

The CVG may, for example, perform a defined procedure in the Mapper, which may comprise extracting the required computation capacity, extracting the local and global data sources to which the application will subscribe, extracting the code that will be executed locally (e.g., VNAS Local code, etc.), extracting the code that will be executed when the data is received back in the Cloud (e.g., VNAS data-event code, etc.), and extracting the code that will be executed when the computation ends and all data is received (e.g., VNAS wrapping code, etc.).

The Mapper may then, for example at block 1025, define the period of the execution of the application, for example first in the entire pool of available MCNs as well as in a per-instance basis of each MCN.

The period of execution per basis and per pool may, for example, be a function, but non-exclusively, of: available resources, paid credits to have priority in the access to resources, general evaluation of code to be executed, and expected duration of execution.

The CVG may then, for example, send the application to the Scheduler, which may then manage the provisioning of the application in (or to) the available resources during the selected duration of execution.

After the application is distributed among the allotted MCNs (e.g., at block 1030) and scheduled for local execution at the MCN(s) (e.g., at block 1055), the application may then begin executing (e.g., at block 1040), and consuming the local MCN resources that were defined by the Scheduler. During the period of execution, data can (e.g., at block 1042) be sent in real-time or in a delay-tolerant manner, to the Harvester. The periodicity and priority of the data may, for example, be defined by the developer while developing the application. Also, additional data can be defined (or specified to be sent to the Harvester after the period of execution terminates). Further, operational data for CVG/MCN operation may be communicated that is outside the control of the application developer.

As discussed herein, the available capacity of the network (e.g., of MCNs, etc.) for computing and for data may be calculated. For example, to determine the existing capacity of the network, the MCNs may communicate various types of information back to the Harvester in the CVG. Such information may, for example, comprise information indicating presently (and/or predicted) available processor (or CPU) capacity, memory load, disk space, etc.

Additionally, the MCNs may also publish the data sources that are available (e.g., directly available to the MCN, indirectly available to the MCN through other nodes, etc.). Data sources may, for example, include all data that is available in (or to) the MCNs either by being provided directly by the host hardware, acquired from the IoT (or other nodes) or in-vehicle sensors that publish their data to the MCN, etc. Some data sources may, for example, be available only in specific locations, for example along the route and/or coverage area of an MCN, may be available only from a vehicle carrying the MCN, etc.

As discussed herein, various aspects of the present disclosure concern performing billing for the services provided. For example, due to the limited capacity of the network, and also for example to enable a number of business cases to be run on top of a system as described herein, billing may be applied to any or all scheduled and distributed applications. Each developer may, for example, have access to a number of credits that are earned by payment of a specific fee or awarded based on any of a variety business criteria. Credits may, for example, be used to provide rightful access to the existing computation and data capacity of the network. For example, when the execution of an application is being managed by the CVG, the Billing module may (e.g., at block 1045) compute the total credit cost of executing such application based on a cost function. The cost function may consider any of a variety of criteria or factors, for example: amount of total computation capability needed (e.g., total number of MCNs needed, total amount of particular resources needed, etc.), priority of execution, priority of developer, expected scheduling and duration of execution, data sources subscribed, amount of data that is transmitted in real-time, amount of data that is transmitted after the period of execution, etc.

Additionally, each of the MCNs may also track (and/or log) the used resource capacity by each of the executing (or running) applications. In an example implementation, to ensure that the billing log is not compromised, a BlockChain sequence is used. Billing logs may then, for example at block 1050, be sent to the CVG as soon as the local computation is complete. The CVG may then, for example, validate the BlockChain in each of the billing logs received from the multiple allocated MCNs and confirm the total number of credits used.

In an example implementation, the applications developed may leverage structured programming language that provides various capabilities. Such capabilities may, for example, comprise the ability to contain a general plain text description of the application functionality; host code that can be run asynchronously; subscribe to CVG libraries and APIs in order to use general functions to subscribe and upload data as well as other system-wide functions; define what data and results need to be updated in real-time, in a delay-tolerant fashion, and after the execution of the application; define the criteria for the end of the execution of the application; define the code that should be executed during and after the execution of the application; describe the number of developer-defined tests for the application, etc.

Systems and methods implemented in accordance with various aspects of the present disclosure may provide a variety of benefits. For example, such systems and methods may make use of excess computation capacity in MCNs (e.g., Mobile APs, Fixed APs, other mobile nodes, etc.), providing part of the Internet of Moving Things to developers and applications as a computation service. Also for example, such systems and methods may make use of the data sources from which data collection is possible from MCNs (e.g., Mobile APs, Fixed APs, other mobile nodes, etc.), providing part of the Internet of Moving Things to developers and applications as a data service. Additionally for example, such systems and methods may make the excess computation capacity and new data sources available with fair access to all developers and applications. Further for example, such systems and methods may map global rules and requirements to local decisions, for example to optimize the usage of the networked computation capacity.

To reduce the total amount of data that needs to be transmitted to the Cloud, systems and methods implemented in accordance with various aspects of this disclosure provide a systematic way of performing at least some of the computation closer in the network to where the data is acquired, reducing the latency to access data as well as the network usage, while making use of the underutilized capacity of the systems in the Internet of Moving Things.

The systems and methods discussed herein may be beneficially utilized in any of a variety of implementations and environments. Such example, such implementations may include stitching between sensors (e.g., local sensor fusion) such as Lidar, Radar and Cameras for 3D Mapping; smart city applications that require massive computing at a lower cost; and autonomous vehicle applications that require very low latency for computation.

MCNs may, for example, make use of further distribution of the computation capacity to other MCNs in their vicinity. For example, an MCN may perform any or all of the CVG functionality discussed herein (albeit at a local level) with regard to neighboring MCNs. Also for example, MCNs can run offline computation and use delay tolerant networking to distribute and acquire both applications and data.

IDE and GUI technology may be utilized for application development sandboxing and virtualization.

Also, as discussed herein, a CVG can predict the available capacity of the MCNs and available data sources based on past data and machine learning.

As discussed herein, any or all of the functionality may be performed in a CVG, MCN, or other network node. An example block diagram of such a network node is provided at FIG. 11.

Figure 11:
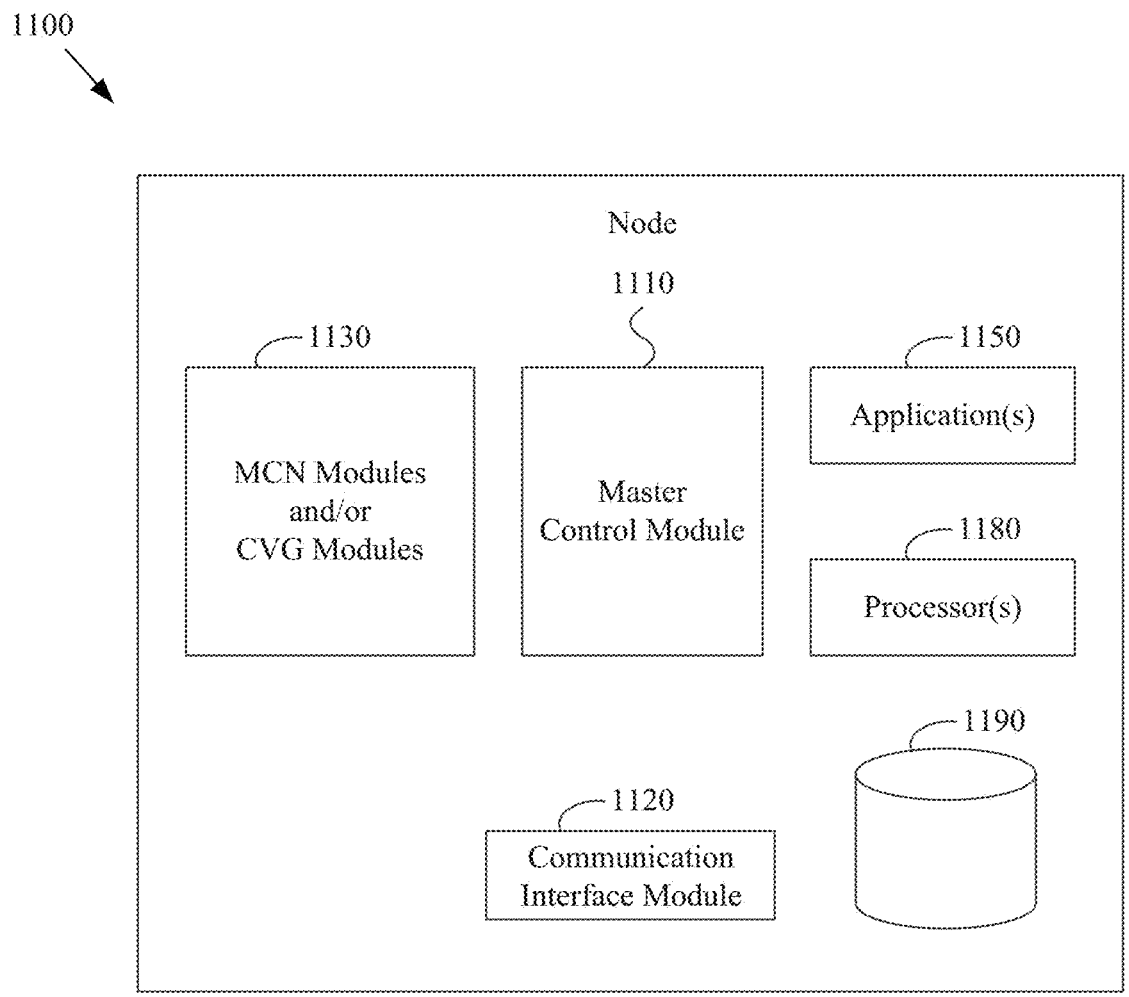
FIG. 11 shows a block diagram of a network node, in accordance with various aspects of the present disclosure.

Turning next to FIG. 11, such figure shows a block diagram of various components of an example network node, in accordance with various aspects of the present disclosure. The example network node 1100 may, for example, share any or all characteristics with the other example networks (and/or network components and/or methods) 100, 200, 300, 400, 500-570, 600, 700, 800, 900, and 1000, discussed herein.

The network node 1100 may, for example, comprise any of the network nodes discussed herein, for example a CVG, an MCN (e.g., an access point (AP) node (e.g., a Mobile AP, a Fixed AP, etc.), a Network Controller node, a Cloud server and/or database, etc. The example node 1100 may comprise a variety of components (or modules), non-limiting examples of which are provided herein. Note that the CVG and/or MCN functionality (or any portion thereof) may be integrated into any of the communication nodes discussed herein, but may also be an independent entity.

The example node 1100 may, for example, comprise a communication interface (I/F) module 1120 (e.g., including a cellular communication interface module, mobile network communication interface module, Wi-Fi communication interface module, user/client communication interface module, etc.) that operates to perform any or all of the wireless and/or wired communication functionality for the node 1100, many examples of which are provided herein (e.g., communication with sensors external to (or of) the node 1100, communication with the onboard diagnostic (OBD) system of a vehicle in which the node 1100 is installed, communication with peer nodes, communication with Mobile APs and/or Fixed APs, communication with Network Controllers, communication with client devices, backhaul communication, Cloud server communication, etc.). The communication interface (I/F) module 1120 may, for example, operate in accordance with any of a variety of cellular communication protocols, 3G, 4G, LTE, wireless LAN communication protocols (e.g., Wi-Fi, etc.), wireless PAN communication protocols (e.g., Bluetooth, etc.), 802.11p or DSRC, satellite communication protocols, fiber or cable communication protocols, LAN protocols (e.g., Ethernet, etc.), TCP/IP, etc.

The example node 1100 may, for example, comprise any of the MCN and/or CVG modules 1130 discussed herein.

The example node 1100 may, for example, comprise a Master Control Module 1110 that generally manages operation of the node 1100 at a high level. Such Master Control Module 1110 may, for example, comprise various aspects of an operating system for the node 1100.

The example node 1100 may further, for example, comprise one or more applications 1150 executing on the node 1100 (e.g., CVG applications, MCN applications, sensor interface applications, mesh networking applications, etc.). Any or all of the applications 1150 may, for example, utilize (e.g., communicate with) the MCN and/or CVG Modules 1130 for any or all of the MCN and/or CVG functionality discussed herein. For example, any or all of the applications 1150 may interact with the MCN and/or CVG Modules 1130 in any of the manners discussed herein.

The example node 1100 may also comprise one or more processors 1180 and memory devices 1190. The processor(s) 1180 may, for example, comprise any of a variety of processor characteristics. For example, the processor(s) 1180 may comprise one or more of a general purpose processor, RIS processor, microcontroller, ASIC, DSP, video processor, etc. The memory device(s) 1190 may, for example, comprise any of a variety of memory characteristics. For example, the memory device(s) 1190 may comprise a volatile memory, non-volatile memory, etc. The memory device(s) 1190 may, for example, comprise one or more hard drives, memory chips, etc. The memory device(s) 1190 may, for example, comprise a non-transitory computer-readable (or machine-readable) medium that comprises software instructions that when executed by the processor(s) 1180, cause the node 1100 (or modules or entities thereof) to perform any or all of the functionality discussed herein (e.g., with regard to the example methods discussed herein, etc.). The memory device(s) 1190 may, for example, store media content information, node information, distribution function information, scheduling information, harvested information, sensor information, any or all of the types of information discussed herein, etc. The memory device(s) 1190 may also, for example, store any or all of the client list and/or topic list information discussed herein.

As explained herein, the functionality (e.g., MCN and/or CVG functionality, etc.) discussed herein may be performed in a single node, for example any or all of the nodes discussed herein, but may also be performed in a distributed manner in which respective portions of the functionality discussed herein are performed by respective nodes.

In accordance with various aspects of this disclosure, examples of the networks and/or components thereof presented herein are provided in U.S. Provisional Application Ser. No. 62/222,192, titled "Communication Network of Moving Things," filed on Sep. 22, 2015, which is hereby incorporated herein by reference in its entirety.

In accordance with various aspects of this disclosure, the networks and/or components thereof presented herein are provided with systems and methods for integrating such networks and/or components with other networks and systems, non-limiting examples of which are provided in U.S. Provisional Application Ser. No. 62/221,997, titled "Integrated Communication Network for A Network of Moving Things," filed on Sep. 22, 2015, which is hereby incorporated herein by reference in its entirety.

Also, in accordance with various aspects of this disclosure, the networks and/or components thereof presented herein are provided with systems and methods for synchronizing such networks and/or components, non-limiting examples of which are provided in U.S. Provisional Application Ser. No. 62/222,016, titled "Systems and Methods for Synchronizing a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for managing such networks and/or components, non-limiting examples of which are provided in U.S. Provisional Application Ser. No. 62/222,042, titled "Systems and Methods for Managing a Network of Moving Things," filed on Sep. 22, 2015, which is hereby incorporated herein by reference in its entirety.

Further, in accordance with various aspects of this disclosure, the networks and/or components thereof presented herein are provided with systems and methods for monitoring such networks and/or components, non-limiting examples of which are provided in U.S. Provisional Application Ser. No. 62/222,066, titled "Systems and Methods for Monitoring a Network of Moving Things," filed on Sep. 22, 2015, which is hereby incorporated herein by reference in its entirety.

Still further, in accordance with various aspects of this disclosure, the networks and/or components thereof presented herein are provided with systems and methods for detecting and/or classifying anomalies in such networks and/or components, non-limiting examples of which are provided in U.S. Provisional Application Ser. No. 62/222,077, titled "Systems and Methods for Detecting and Classifying Anomalies in a Network of Moving Things," filed on Sep. 22, 2015, which is hereby incorporated herein by reference in its entirety.

Yet further, in accordance with various aspects of this disclosure, the networks and/or components thereof presented herein are provided with systems and methods for managing mobility in such networks and/or components, non-limiting examples of which are provided in U.S. Provisional Application Ser. No. 62/222,098, titled "Systems and Methods for Managing Mobility in a Network of Moving Things," filed on Sep. 22, 2015, which is hereby incorporated herein by reference in its entirety.

Also, in accordance with various aspects of this disclosure, the networks and/or components thereof presented herein are provided with systems and methods for managing connectivity in such networks and/or components, non-limiting examples of which are provided in U.S. Provisional Application Ser. No. 62/222,121, titled "Systems and Methods for Managing Connectivity a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for collecting sensor data in such networks and/or components, non-limiting examples of which are provided in U.S. Provisional Application Ser. No. 62/222,135, titled "Systems and Methods for Collecting Sensor Data in a Network of Moving Things," filed on Sep. 22, 2015, which is hereby incorporated herein by reference in its entirety.

Further, in accordance with various aspects of this disclosure, the networks and/or components thereof presented herein are provided with systems and methods for interfacing with such networks and/or components, non-limiting examples of which are provided in U.S. Provisional Application Ser. No. 62/222,145, titled "Systems and Methods for Interfacing with a Network of Moving Things," filed on Sep. 22, 2015, which is hereby incorporated herein by reference in its entirety.

Still further, in accordance with various aspects of this disclosure, the networks and/or components thereof presented herein are provided with systems and methods for interfacing with a user of such networks and/or components, non-limiting examples of which are provided in U.S. Provisional Application Ser. No. 62/222,150, titled "Systems and Methods for Interfacing with a User of a Network of Moving Things," filed on Sep. 22, 2015, which is hereby incorporated herein by reference in its entirety.

Yet further, in accordance with various aspects of this disclosure, the networks and/or components thereof presented herein are provided with systems and methods for data storage and processing in such networks and/or components, non-limiting examples of which are provided in U.S. Provisional Application Ser. No. 62/222,168, titled "Systems and Methods for Data Storage and Processing for a Network of Moving Things," filed on Sep. 22, 2015, which is hereby incorporated herein by reference in its entirety.

Also, in accordance with various aspects of this disclosure, the networks and/or components thereof presented herein are provided with systems and methods for vehicle traffic management in such networks and/or components, non-limiting examples of which are provided in U.S. Provisional Application Ser. No. 62/222,183, titled "Systems and Methods for Vehicle Traffic Management in a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for environmental management in such networks and/or components, non-limiting examples of which are provided in U.S. Provisional Application Ser. No. 62/222,186, titled "Systems and Methods for Environmental Management in a Network of Moving Things," filed on Sep. 22, 2015, which is hereby incorporated herein by reference in its entirety.

Further, in accordance with various aspects of this disclosure, the networks and/or components thereof presented herein are provided with systems and methods for managing port or shipping operation in such networks and/or components, non-limiting examples of which are provided in U.S. Provisional Application Ser. No. 62/222,190, titled "Systems and Methods for Port Management in a Network of Moving Things," filed on Sep. 22, 2015, which is hereby incorporated herein by reference in its entirety.

Also, in accordance with various aspects of this disclosure, the networks and/or components thereof presented herein are provided with systems and methods for enhancing the accuracy of positioning or location information based at least in part on historical data, non-limiting examples of which are provided in U.S. Provisional Application Ser. No. 62/244,828, titled "Utilizing Historical Data to Correct GPS Data in a Network of Moving Things," filed on Oct. 22, 2015, which is hereby incorporated herein by reference in its entirety.

Additionally, in accordance with various aspects of this disclosure, the networks and/or components thereof presented herein are provided with systems and methods for enhancing the accuracy of position or location of positioning or location information based at least in part on the utilization of anchors, non-limiting examples of which are provided in U.S. Provisional Application Ser. No. 62/244,930, titled "Using Anchors to Correct GPS Data in a Network of Moving Things," filed on Oct. 22, 2015, which is hereby incorporated herein by reference in its entirety.

Further, in accordance with various aspects of this disclosure, the networks and/or components thereof presented herein are provided with systems and methods for providing communication between applications, non-limiting examples of which are provided in U.S. Provisional Application Ser. No. 62/246,368, titled "Systems and Methods for Inter-Application Communication in a Network of Moving Things," filed on Oct. 26, 2015, which is hereby incorporated herein by reference in its entirety.

Still further, in accordance with various aspects of this disclosure, the networks and/or components thereof presented herein are provided with systems and methods for probing, analyzing and/or validating communication, non-limiting examples of which are provided in U.S. Provisional Application Ser. No. 62/246,372, titled "Systems and Methods for Probing and Validating Communication in a Network of Moving Things," filed on Oct. 26, 2015, which is hereby incorporated herein by reference in its entirety.

Yet further, in accordance with various aspects of this disclosure, the networks and/or components thereof presented herein are provided with systems and methods for adapting communication rate, non-limiting examples of which are provided in U.S. Provisional Application Ser. No. 62/250,544, titled "Adaptive Rate Control for Vehicular Networks," filed on Nov. 4, 2015, which is hereby incorporated herein by reference in its entirety.

Also, in accordance with various aspects of this disclosure, the networks and/or components thereof presented herein are provided with systems and methods for reconfiguring and adapting hardware, non-limiting examples of which are provided in U.S. Provisional Application Ser. No. 62/273,878, titled "Systems and Methods for Reconfiguring and Adapting Hardware in a Network of Moving Things," filed on Dec. 31, 2015, which is hereby incorporated herein by reference in its entirety.

Additionally, in accordance with various aspects of this disclosure, the networks and/or components thereof presented herein are provided with systems and methods for optimizing the gathering of data, non-limiting examples of which are provided in U.S. Provisional Application Ser. No. 62/253,249, titled "Systems and Methods for Optimizing Data Gathering in a Network of Moving Things," filed on Nov. 10, 2015, which is hereby incorporated herein by reference in its entirety.

Further, in accordance with various aspects of this disclosure, the networks and/or components thereof presented herein are provided with systems and methods for performing delay tolerant networking, non-limiting examples of which are provided in U.S. Provisional Application Ser. No. 62/257,421, titled "Systems and Methods for Delay Tolerant Networking in a Network of Moving Things," filed on Nov. 19, 2015, which is hereby incorporated herein by reference in its entirety.

Still further, in accordance with various aspects of this disclosure, the networks and/or components thereof presented herein are provided with systems and methods for improving the coverage and throughput of mobile access points, non-limiting examples of which are provided in U.S. Provisional Application Ser. No. 62/265,267, titled "Systems and Methods for Improving Coverage and Throughput of Mobile Access Points in a Network of Moving Things," filed on Dec. 9, 2015, which is hereby incorporated herein by reference in its entirety.

Yet further, in accordance with various aspects of this disclosure, the networks and/or components thereof presented herein are provided with systems and methods for coordinating channel utilization, non-limiting examples of which are provided in U.S. Provisional Application Ser. No. 62/270,858, titled "Channel Coordination in a Network of Moving Things," filed on Dec. 22, 2015, which is hereby incorporated herein by reference in its entirety.

Also, in accordance with various aspects of this disclosure, the networks and/or components thereof presented herein are provided with systems and methods for implementing a network coded mesh network in the network of moving things, non-limiting examples of which are provided in U.S. Provisional Application Ser. No. 62/257,854, titled "Systems and Methods for Network Coded Mesh Networking in a Network of Moving Things," filed on Nov. 20, 2015, which is hereby incorporated herein by reference in its entirety.

Additionally, in accordance with various aspects of this disclosure, the networks and/or components thereof presented herein are provided with systems and methods for improving the coverage of fixed access points, non-limiting examples of which are provided in U.S. Provisional Application Ser. No. 62/260,749, titled "Systems and Methods for Improving Fixed Access Point Coverage in a Network of Moving Things," filed on Nov. 30, 2015, which is hereby incorporated herein by reference in its entirety.

Further, in accordance with various aspects of this disclosure, the networks and/or components thereof presented herein are provided with systems and methods for managing mobility controllers and their network interactions, non-limiting examples of which are provided in U.S. Provisional Application Ser. No. 62/273,715, titled "Systems and Methods for Managing Mobility Controllers and Their Network Interactions in a Network of Moving Things," filed on Dec. 31, 2015, which is hereby incorporated herein by reference in its entirety.

Still further, in accordance with various aspects of this disclosure, the networks and/or components thereof presented herein are provided with systems and methods for managing and/or triggering handovers of mobile access points, non-limiting examples of which are provided in U.S. Provisional Application Ser. No. 62/281,432, titled "Systems and Methods for Managing and Triggering Handovers of Mobile Access Points in a Network of Moving Things," filed on Jan. 21, 2016, which is hereby incorporated herein by reference in its entirety.

Yet further, in accordance with various aspects of this disclosure, the networks and/or components thereof presented herein are provided with systems and methods for performing captive portal-related control and management, non-limiting examples of which are provided in U.S. Provisional Application Ser. No. 62/268,188, titled "Captive Portal-related Control and Management in a Network of Moving Things," filed on Dec. 16, 2015, which is hereby incorporated herein by reference in its entirety.

Also, in accordance with various aspects of this disclosure, the networks and/or components thereof presented herein are provided with systems and methods for extrapolating high-value data, non-limiting examples of which are provided in U.S. Provisional Application Ser. No. 62/270,678, titled "Systems and Methods to Extrapolate High-Value Data from a Network of Moving Things," filed on Dec. 22, 2015, which is hereby incorporated herein by reference in its entirety.

Additionally, in accordance with various aspects of this disclosure, the networks and/or components thereof presented herein are provided with systems and methods for providing remote software updating and distribution, non-limiting examples of which are provided in U.S. Provisional Application Ser. No. 62/272,750, titled "Systems and Methods for Remote Software Update and Distribution in a Network of Moving Things," filed on Dec. 30, 2015, which is hereby incorporated herein by reference in its entirety.

Further, in accordance with various aspects of this disclosure, the networks and/or components thereof presented herein are provided with systems and methods for providing remote configuration updating and distribution, non-limiting examples of which are provided in U.S. Provisional Application Ser. No. 62/278,662, titled "Systems and Methods for Remote Configuration Update and Distribution in a Network of Moving Things," filed on Jan. 14, 2016, which is hereby incorporated herein by reference in its entirety.

Still further, in accordance with various aspects of this disclosure, the networks and/or components thereof presented herein are provided with systems and methods for adapting the network, for example automatically, based on user feedback, non-limiting examples of which are provided in U.S. Provisional Application Ser. No. 62/286,243, titled "Systems and Methods for Adapting a Network of Moving Things Based on User Feedback," filed on Jan. 22, 2016, which is hereby incorporated herein by reference in its entirety.

Yet further, in accordance with various aspects of this disclosure, the networks and/or components thereof presented herein are provided with systems and methods for enhancing and/or guaranteeing data integrity when building or performing data analytics, non-limiting examples of which are provided in U.S. Provisional Application Ser. No. 62/278,764, titled "Systems and Methods to Guarantee Data Integrity When Building Data Analytics in a Network of Moving Things," Jan. 14, 2016, which is hereby incorporated herein by reference in its entirety.

Also, in accordance with various aspects of this disclosure, the networks and/or components thereof presented herein are provided with systems and methods for performing self-initialization and/or automated bootstrapping of mobile access points, non-limiting examples of which are provided in U.S. Provisional Application Ser. No. 62/286,515, titled "Systems and Methods for Self-Initialization and Automated Bootstrapping of Mobile Access Points in a Network of Moving Things," filed on Jan. 25, 2016, which is hereby incorporated herein by reference in its entirety.

Additionally, in accordance with various aspects of this disclosure, the networks and/or components thereof presented herein are provided with systems and methods for managing power supply and/or utilization, non-limiting examples of which are provided in U.S. Provisional Application Ser. No. 62/295,602, titled "Systems and Methods for Power Management in a Network of Moving Things," filed on Feb. 16, 2016, which is hereby incorporated herein by reference in its entirety.

Further, in accordance with various aspects of this disclosure, the networks and/or components thereof presented herein are provided with systems and methods for automating and easing the installation and setup of the infrastructure, non-limiting examples of which are provided in U.S. Provisional Application Ser. No. 62/299,269, titled "Systems and Methods for Automating and Easing the Installation and Setup of the Infrastructure Supporting a Network of Moving Things," filed on Feb. 24, 2016, which is hereby incorporated herein by reference in its entirety.

In summary, various aspects of this disclosure provide communication network architectures, systems and methods for supporting a network of mobile nodes. As a non-limiting example, various aspects of this disclosure provide communication network architectures, systems, and methods for managing resource utilization in a network of moving things, for example including autonomous vehicles. While the foregoing has been described with reference to certain aspects and examples, it will be understood by those skilled in the art that various changes may be made and equivalents may be substituted without departing from the scope of the disclosure. In addition, many modifications may be made to adapt a particular situation or material to the teachings of the disclosure without departing from its scope. Therefore, it is intended that the disclosure not be limited to the particular example(s) disclosed, but that the disclosure will include all examples falling within the scope of the appended claims.

What is claimed is:

1. A vehicle communication network comprising:
a wireless access point (AP) comprising:
    at least one AP transceiver;
    an AP processor and memory; and
    at least one module operable to, at least:
        utilize the at least one AP transceiver to provide wireless network connectivity to other devices within communication range of the wireless AP;
        utilize the at least one AP transceiver to receive an application; and
        execute the application; and
a second node comprising:
    a second node processor and memory; and
    at least one module operable to, at least:
        receive the application from an application source;
        determine a level of availability of a sharable resource of the wireless AP;
        determine a location of the wireless AP;
        determine, based at least in part on both of the determined level of availability of the sharable resource of the wireless AP and the determined location of the wireless AP, whether to map the application to the wireless AP; and
        if it is determined to map the application to the wireless AP, then:
            communicate the application to the wireless AP for execution by the wireless AP; and
            during execution of the application by the wireless AP, control execution of the application by the wireless AP.

2. The vehicle communication network of claim 1, wherein the wireless AP is mobile.

3. The vehicle communication network of claim 1, wherein the at least one module of the second node is operable to schedule execution of the application by the wireless AP.

4. The vehicle communication network of claim 1, wherein the at least one module of the second node is operable to, during execution of the application by the wireless AP:
monitor the level of availability of the sharable resource of the wireless AP; and
adjust the execution of the application by the wireless AP based, at least in part, on the monitored level of availability.

5. The vehicle communication network of claim 1, wherein the wireless AP is a Mobile AP, and the at least one module of the second node is operable to:
determine a trajectory of the wireless AP; and
determine whether to map the application to the wireless AP based, at least in part, on the determined trajectory of the wireless AP.

6. The vehicle communication network of claim 1, wherein:
the at least one module of the wireless AP is operable to utilize the at least one transceiver of the wireless AP to communicate a message comprising information identifying the level of availability of the sharable resource of the wireless AP; and
the at least one module of the second node is operable to:
    receive the message from the wireless AP; and determine the level of availability of the sharable resource of the wireless AP based, at least in part, on contents of the message.

7. The vehicle communication network of claim 1, wherein the sharable resource of the wireless AP comprises a data source external to the wireless AP to which the wireless AP has access.

8. The vehicle communication network of claim 7, wherein the data source comprises a sensor.

9. The vehicle communication network of claim 7, wherein the data source comprises an on-board system of a vehicle that is carrying the wireless AP.

10. The vehicle communication network of claim 1, comprising a second wireless AP, wherein the at least one module of the second access point is operable to transition execution of the application from the wireless AP to the second wireless AP based, at least in part, on a location of the wireless AP and on a location of the second wireless AP.

11. The vehicle communication network of claim 1, comprising a second wireless AP, wherein the at least one module of the second access point is operable to transition execution of the application from the wireless AP to the second wireless AP based, at least in part, on a trajectory of the wireless AP and on a trajectory of the second wireless AP.

12. A wireless access point (AP) for use in a vehicle communication network, the wireless AP comprising:
at least one transceiver;
a processor and memory; and
at least one module operable to, at least:
utilize the at least one transceiver to provide wireless network connectivity to other devices within communication range of the wireless AP;
utilize the at least one transceiver to communicate first information to a second system via at least the vehicle communication network, wherein the first information comprises information identifying a level of availability of a sharable resource of the wireless AP; and
in response to, at least, the communicated first information, at least:
utilize the at least one transceiver to receive an application from the second system to execute utilizing the sharable resource; and
execute the application under control of the second system; and
wherein the at least one module is operable to utilize the at least one transceiver to:
communicate second information to the second system, wherein the second information comprises information identifying a location of the wireless AP; and
receive the application from the second system in response also to the communicated second information.

13. The wireless access point (AP) of claim 12, wherein the wireless AP is mobile.

14. The wireless access point (AP) of claim 12, wherein the at least one module is operable to, during execution of the application, utilize the at least one transceiver to communicate second information to the second system via at least the vehicle communication network, wherein the second information comprises updated information identifying the level of availability of the sharable resource.

15. The wireless access point (AP) of claim 12, wherein the at least one module is operable to utilize the at least one transceiver to:
communicate third information to the second system, wherein the third information comprises information identifying a trajectory of the wireless AP; and
receive the application from the second system in response also to the communicated third information.

16. The wireless access point (AP) of claim 12, wherein the at least one module is operable to:
monitor utilization of the sharable resource by the application; and
utilize the at least one transceiver to communicate utilization information to the second system regarding the monitored amount of utilization.

17. The wireless access point (AP) of claim 12, wherein the sharable resource of the wireless AP comprises a data source external to the wireless AP to which the wireless AP has access.

18. A network node for use in a vehicle communication network, the network node comprising:
a processor and memory; and
at least one module operable to, at least:
receive an application from an application source;
determine a level of availability of a sharable resource of a wireless AP of the vehicle communication network;
determine a location of the wireless AP;
determine, based at least in part on both of the determined level of availability of the sharable resource of the wireless AP and the determined location of the wireless AP, whether to map the application to the wireless AP; and
if it is determined to map the application to the wireless AP, then:
communicate the application to the wireless AP for execution by the wireless AP; and
during execution of the application by the wireless AP, control execution of the application by the wireless AP.

19. The network node of claim 18, wherein the at least one module is operable to, during execution of the application by the wireless AP:
monitor the level of availability of the sharable resource of the wireless AP; and
adjust the execution of the application by the wireless AP based, at least in part, on the monitored level of availability.

20. The network node of claim 18, wherein the at least one module of the second access point is operable to transition execution of the application from the wireless AP to a second wireless AP of the vehicle communication network based, at least in part, on a location of the wireless AP and on a location of the second wireless AP.

* * * * *